(12) United States Patent
Kobayashi et al.

(10) Patent No.: US 7,218,342 B2
(45) Date of Patent: May 15, 2007

(54) PAN/TILT/ZOOM SURVEILLANCE SYSTEM AND METHOD FOR DYNAMICALLY ADJUSTING A USER DEFINED IMAGE PICTURE MASK

(75) Inventors: Mitsunori Kobayashi, Fujisawa (JP); Makoto Kikuchi, Hitachinaka (JP); Shigehisa Rokuta, Mito (JP)

(73) Assignee: Hitachi, Ltd., Tokyo (JP)

( * ) Notice: Subject to any disclaimer, the term of this patent is extended or adjusted under 35 U.S.C. 154(b) by 752 days.

(21) Appl. No.: 10/313,640

(22) Filed: Dec. 5, 2002

(65) Prior Publication Data
US 2003/0227555 A1    Dec. 11, 2003

(30) Foreign Application Priority Data
Jun. 6, 2002    (JP) ............................. 2002-165058

(51) Int. Cl.
   - H04N 7/18    (2006.01)
   - H04N 9/47    (2006.01)
   - H04N 5/225   (2006.01)
   - H04N 5/232   (2006.01)
   - G06K 9/36    (2006.01)

(52) U.S. Cl. .................. 348/211.8; 348/143; 348/169; 348/211.9; 348/211.13; 348/211.14; 382/283

(58) Field of Classification Search ................ 348/143, 348/169, 207.99, 207.1, 207.11, 211.99, 211.8–211.9, 348/211.13–14; 382/103, 283
See application file for complete search history.

(56) References Cited

U.S. PATENT DOCUMENTS 6,509,926 B1 *  1/2003  Mills et al. .................. 348/143
6,727,938 B1 *  4/2004  Randall ....................... 348/143
6,744,461 B1 *  6/2004  Wada et al. .................. 348/143
7,161,615 B2 *  1/2007  Pretzer et al. ............... 348/143

FOREIGN PATENT DOCUMENTS

JP    06-181539        6/1994
JP    2001-061137   *  3/2001
JP    2001-069494      3/2001

OTHER PUBLICATIONS

English abstract and computer generated English translation of Japanese Patent Publication 2001-061137 to Kobayashi.*

* cited by examiner

*Primary Examiner*—Ngoc-Yen Vu
*Assistant Examiner*—Dan Pasiewicz
(74) *Attorney, Agent, or Firm*—Townsend and Townsend and Crew LLP

(57) ABSTRACT

A surveillance camera apparatus includes a first storage unit for storing a size of pixels configuring a image-sensor, a computation unit for performing a computation using first information, second information, third information, and fourth information to calculate angle information on a plurality of vertex-points, the information stored in the first storage unit being defined as the first information, a focal length of an optical lens being defined as the second information, angle information on an optical axis that passes through a rotation center of the surveillance camera apparatus as the third information, and pixel information corresponding to a plurality of vertex-points that form a region to be masked whose image has been picked up by the image-sensor being defined as the fourth information, and a second storage unit for storing the computation result by the computation unit.

20 Claims, 19 Drawing Sheets

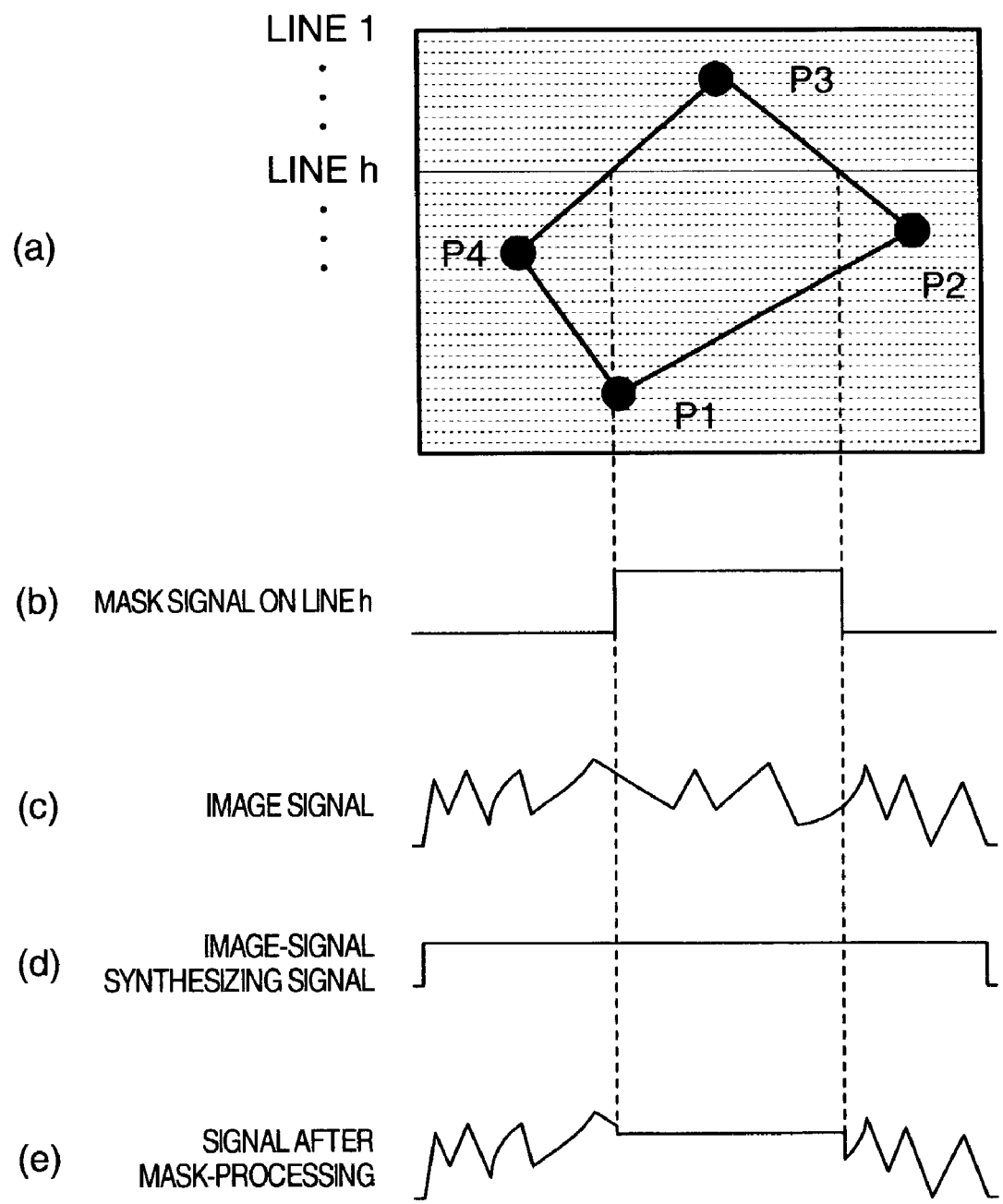

PHOTOGRAPH-TARGET DISPLACEMENT CAUSED
BY PAN ROTATION DIRECTLY BESIDE CAMERA'S DIRECTION

PHOTOGRAPH-TARGET DISPLACEMENT CAUSED
BY PAN ROTATION DIRECTLY BELOW OR ABOVE CAMERA'S DIRECTION

PHOTOGRAPH-TARGET DISPLACEMENT CAUSED BY TILT ROTATION

29 ∼ Pn : VERTEX-POINTS OF MASK

40 ∼ Mfg : VERTEX-POINTS OF HORIZONTAL×VERTICAL RECTANGLE CIRCUMSCRIBING GEOMETRICAL-FIGURE SURROUNDED BY Pn

29 — Pn : VERTEX-POINTS OF MASK

29 — Pn : VERTEX-POINTS OF MASK

33 — NWst : INTERSECTION-POINTS OF LINE-SEGMENTS PsPt
AND STRAIGHT LINES INCLUDING PICTURE-FRAME

33 — NWst: INTERSECTION-POINTS OF LINE-SEGMENTS PsPt
    AND STRAIGHT LINES INCLUDING PICTURE-FRAME

38 — P'n: Pn INSIDE PICTURE-FRAME

38 — P'n : Pn INSIDE PICTURE-FRAME

39 — N'Wst : POINTS AFTER MODIFYING NWST

38 — P'n : Pn INSIDE PICTURE-FRAME

39 — N'Wst : POINTS AFTER MODIFYING NWst

40 — Mfg : VERTEX-POINTS OF HORIZONTAL×VERTICAL RECTANGLE CIRCUMSCRIBING GEOMETRICAL-FIGURE SURROUNDED BY P'n, N'Wst

PAN/TILT/ZOOM SURVEILLANCE SYSTEM AND METHOD FOR DYNAMICALLY ADJUSTING A USER DEFINED IMAGE PICTURE MASK

BACKGROUND OF THE INVENTION

The present invention relates to a surveillance camera that is mounted onto a for-surveillance-camera rotary base capable of performing a pan (i.e., transverse oscillation) rotation and a tilt (i.e., longitudinal oscillation) rotation. Moreover, the surveillance camera is a one which, in order to protect privacy, includes a mask storage unit and a mask display unit for masking only a privacy-protected range photographed in part of an image.

In the surveillance camera, a video camera is fixed onto the for-surveillance-camera rotary base that is freely rotatable in the pan direction and the tilt direction. This surveillance camera is the following system: An external controller unit operates the for-surveillance-camera rotary base, zooming of the camera, and the like, thereby freely changing an image spot to be photographed by the camera. This surveillance system, in general, includes a sequence function for storing a plurality of image spots so as to project in sequence these stored image spots at a constant point-in-time, an alarm function that, if an unusual event happens, causes the camera to instantaneously direct toward that direction, and the like. Here, the alarm function is implemented by setting up a human-sensitive sensor or the like in a surveillance area. When setting up the surveillance system like this in public places such as a street, there exists a problem of dealing with such a spot as a private house that is undesirable to be photographed from the viewpoint of the privacy protection. As a solving method for this problem, there exists a one of masking, with another image, a spot that necessitates the privacy protection. Hereinafter, the explanation will be given below concerning conventional privacy masking methods.

In JP-A-6-181539, the following method has been described: A privacy-protected range is stored in advance by the central angles and the range widths in the vertical direction and the horizontal direction. Next, if division areas, which result from dividing an image output into M-row and N-column areas, overlap partially with the privacy-protected range, the division areas are masked. In this method, the image output is masked on the M-row and N-column division basis. This eventually masks the portion that need not be masked, thereby lowering the surveillance function. Also, the range to be masked is managed using the angles in the vertical and the horizontal directions. This causes a difference to occur between a rotation displacement of the photograph-target, which, as illustrated in FIG. 8B, is caused by the pan rotation near a location directly below or above the camera's direction, and vertical and horizontal displacements of the mask. As a result, there exists a problem that the mask deviates from the privacy mask.

In JP-A-2001-69494, the following method has been described: The privacy-protected range is stored in advance by the coordinates on the absolute coordinate system, the size thereon, or the like. At the time of displaying the mask, the absolute coordinate system is converted into the picture coordinate system, then causing the mask to be displayed. In this method, a tilt angle at which the camera's direction is directed toward near a location directly below or above the camera-mounted position, the rotation displacement of the photograph-target becomes larger, and accordingly the masking exhibits no significant effect. On account of this, the above-described method has applied no masking near the location directly below or above the camera-mounted position where the rotation displacement becomes larger. Also, when setting up the privacy-protected range, the masking exhibits no significant effect on photograph-targets which, as illustrated in FIG. 8A and FIG. 8C, exist at the picture edges and thus whose images have been distorted. On account of this, the method has set up the privacy-protected range at the picture center.

SUMMARY OF THE INVENTION

It is an object of the present invention to allow the following conventionally-impossible implementations without lowering the surveillance function: Implementing the masking over a privacy-protected range near a location directly below or above the camera's direction, implementing the mask setting-up at a picture edge where the image distortion is large, and implementing a reduction in the calculation error of the mask display caused by a deviation of the camera-mounted position and that of the pan/tilt rotation center.

A 1st embodiment of a surveillance camera according to the present invention includes the following components as its basic configurations: First, an optical system of a lens and an image-sensor, second, a computation unit for calculating the determination and the display of a position to be masked, third, a data storage unit for storing the mask data and data for allowing this surveillance camera to operate normally, and fourth, an image signal processing unit for applying a partial mask to an image signal from the image-sensor so as to image-output the partially masked image signal. In addition, this surveillance camera is a one mounted on a rotary base so as to be rotated, and the surveillance camera, including this rotary base, constitutes a surveillance camera system apparatus. Furthermore, the surveillance camera includes a communications unit for establishing communications with a controller section for operating this surveillance camera system apparatus, a monitor section for displaying an image, and the like.

The first optical system includes the lens located fixedly on the optical path, and the image-sensor for receiving light, which has passed through the lens, and for converting the received light into an electrical signal.

The second computation unit includes, as a construction element (b), a mask data calculation processing section for determining the region to be masked, and, as a construction element (c), a mask-displayed position calculation processing section. Here, the calculation processings by these processing sections are performed using information from the storage unit described later, pan and tilt rotation angle information (hereinafter, referred to as "pan/tilt angle information") on the rotary base, and masked-region setting-up information from the controller section.

The third storage unit includes the following sections: A first storage section (memory C) for storing the size of pixels of the image-sensor, a second storage section (memory D) for storing the calculation result by the mask data calculation processing section, and further a data memory section (memory B) for storing data on the focal length of the lens system.

The fourth image signal processing unit, based on the information on the mask vertex-points calculated by the second computation unit, processes, into a masked image-sensed picture, part of the image signal transmitted from the image-sensor. Then, the processing unit sends out this image-sensed picture to the controller section and the monitor section existing outside.

Also, between the controller section and the monitor section, there is configured the communications unit for transmitting/receiving a control instruction of photographing a photograph-target and an instruction of determining the position to be masked.

At the time of setting up the mask, in accordance with the mask setting-up instruction from the controller section, the pan and tilt angles of the respective vertex-points of the mask configuration are calculated, then being stored into the second storage section. Here, these calculations are performed using the pan/tilt angle information on the rotary base at that time, the size of the image-sensor's one pixel stored in the first storage section, and the focal length of the lens.

At the time of displaying the mask, the position to be masked on the image-sensor's surface is calculated from the pan/tilt angle information on the rotary base, the size of the image-sensor's one pixel, the focal length of the lens, and the information stored into the second storage section. Moreover, the image signal processing unit performs a mask-processing toward the part of the image signal, then sending out the partially masked image-sensed picture to the controller section and the monitor section.

In a 2nd embodiment of the surveillance camera according to the present invention, the following configurations are added to those described in the 1st embodiment. This makes it possible to even further enhance the accuracy of the position to be masked, i.e., the object of the present invention.

The 2nd embodiment of the surveillance camera according to the present invention, as its basic configurations, differs from the 1st embodiment in the following components: First, an optical system of a zoom-lens, which is displaced on the optical axis, and an image-sensor, second, a driving unit for displacing the zoom-lens and a position detecting unit for detecting the position thereof, and third, a computation unit for calculating the determination of the position to be masked and the focal length. The other components, e.g., fourth, the data storage unit, fifth, the image signal processing unit, the rotary base, the controller section, the monitor section, and the communications unit therewith are the same as those in the 1st embodiment.

The explanation will be given below mainly concerning the components that differ from those in the 1st embodiment.

The first optical system includes the zoom-lens located on the optical path in the displaceable manner. The second driving unit and position detecting unit are, as a construction element (a), a zoom-lens driving section for displacing the zoom-lens in accordance with information, which is received from the controller section and is about a camera zoom position at which the zooming is wished to be achieved, and a zoom-lens position detecting section for detecting the zoom-lens position, respectively.

The third computation unit includes, as the construction element (a), a calculation processing section for calculating the focal length from the zoom-lens position, as the construction element (b), the mask data calculation processing section for determining a region to be masked, and, as the construction element (c), the mask-displayed position calculation processing section. Here, the calculation processings by these processing sections are performed using the information from the storage unit described later, the pan/tilt angle information on the rotary base, and the masked-region setting-up information from the controller section.

The fourth storage unit includes the following sections: In addition to the first storage section (memory C) for storing the size of pixels of the image-sensor, and the second storage section (memory D) for storing the calculation result by the mask data calculation processing section, a memory section (memory B) for storing VARI-f characteristics data indicating the relationship between the zoom-lens position and the focal length.

The fifth image signal processing unit is the same as the one in the 1st embodiment.

At the time of setting up the mask, in accordance with a mask setting-up instruction from the controller section, the focal length is calculated from the pan/tilt angle information at that time, the size of the image-sensor's one pixel stored in the first storage section, and the position information on the zoom-lens. Next, from these pieces of information, the pan and tilt angles of the respective vertex-points of the mask configuration are calculated, then being stored into the second storage section.

At the time of displaying the mask, the focal length is determined using the pan/tilt angle information on the rotary base, the size of the image-sensor's one pixel, and the position information on the zoom-lens. Next, from these pieces of information and the information stored into the second storage section, the position to be masked on the image-sensor's surface is calculated. Moreover, the image signal processing unit performs a mask-processing toward part of the image signal, then sending out a partially masked image-sensed picture to the controller section and the monitor section.

In a 3rd embodiment of the surveillance camera according to the present invention, the following configurations are added to those described in the 2nd embodiment. This makes it possible to enhance the accuracy of the position to be masked, i.e., the object of the present invention, higher than the one in the 2nd embodiment.

In this 3rd embodiment, of the above-described first to fifth basic configurations in the 2nd embodiment, a focus-lens is added to the first optical system. The second driving unit and position detecting unit include, as the construction element (b), a focus-lens driving section for achieving the focus, and a focus-lens position detecting section. Also, the third computation unit includes, as a construction element (d), a calculation processing section in addition to the above-described the construction elements (a), (b), and (c). This calculation processing section calculates the distance from the pan/tilt rotation center to a photograph-target (i.e., photograph-target distance data), using data stored in a memory A described later and the focus-lens position detected from the focus-lens position detecting section. This calculation processing becomes a distance-measuring unit for measuring the distance to the photograph-target.

The fourth storage unit additionally locates therein the memory A for storing data on the distance from the image-sensor's center to the pan/tilt rotation center. This data and the result obtained by adding the above-described as the construction element (d) as well to the calculation are stored into the second storage section.

The other configurations are the same as those in the 2nd embodiment.

At the time of setting up the mask, in accordance with a mask setting-up instruction from the controller section, the focal length is calculated from the pan/tilt angle information at that time, the size of the image-sensor's one pixel stored in the first storage section, and the position information on the zoom-lens. Next, from these pieces of information and the distance from the image-sensor to the pan/tilt rotation center at the time of setting up the mask, the pan and tilt angles of the respective vertex-points of the mask configuration are calculated, then being stored into the second storage section. Simultaneously, the above-described photograph-target distance data is also stored therein.

At the time of displaying the mask, the focal length is determined using the pan/tilt angle information on the rotary base, the size of the image-sensor's one pixel, and the position information on the zoom-lens. Next, from the photograph-target distance data stored in the second storage section, the positioning of the focus-lens is performed, then driving the focus-lens there. Also, from the above-described pieces of information, the photograph-target distance data, and the distance from the image-sensor to the pan/tilt rotation center, including the information from the second storage section as well, the position to be masked on the image-sensor's surface is calculated. Moreover, the image signal processing unit performs a mask-processing toward part of the image signal, then sending out a partially masked image-sensed picture to the controller section and the monitor section.

A 4th embodiment according to the present invention provides a processing in the case where a region to be masked has extended off the picture-frame of an image-sensed picture. Accordingly, the 4th embodiment is applicable to the above-described 1st to 3rd embodiments. The configurations and operations thereof are all the same, except a point that the calculation processing methods are changed in the computation units of the 1st to 3rd embodiments.

Other objects, features and advantages of the invention will become apparent from the following description of the embodiments of the invention taken in conjunction with the accompanying drawings.

BRIEF DESCRIPTION OF THE DRAWINGS

FIG. 7 is a diagram for illustrating a masking method of masking an image signal;

DESCRIPTION OF THE EMBODIMENTS

Figure 1:
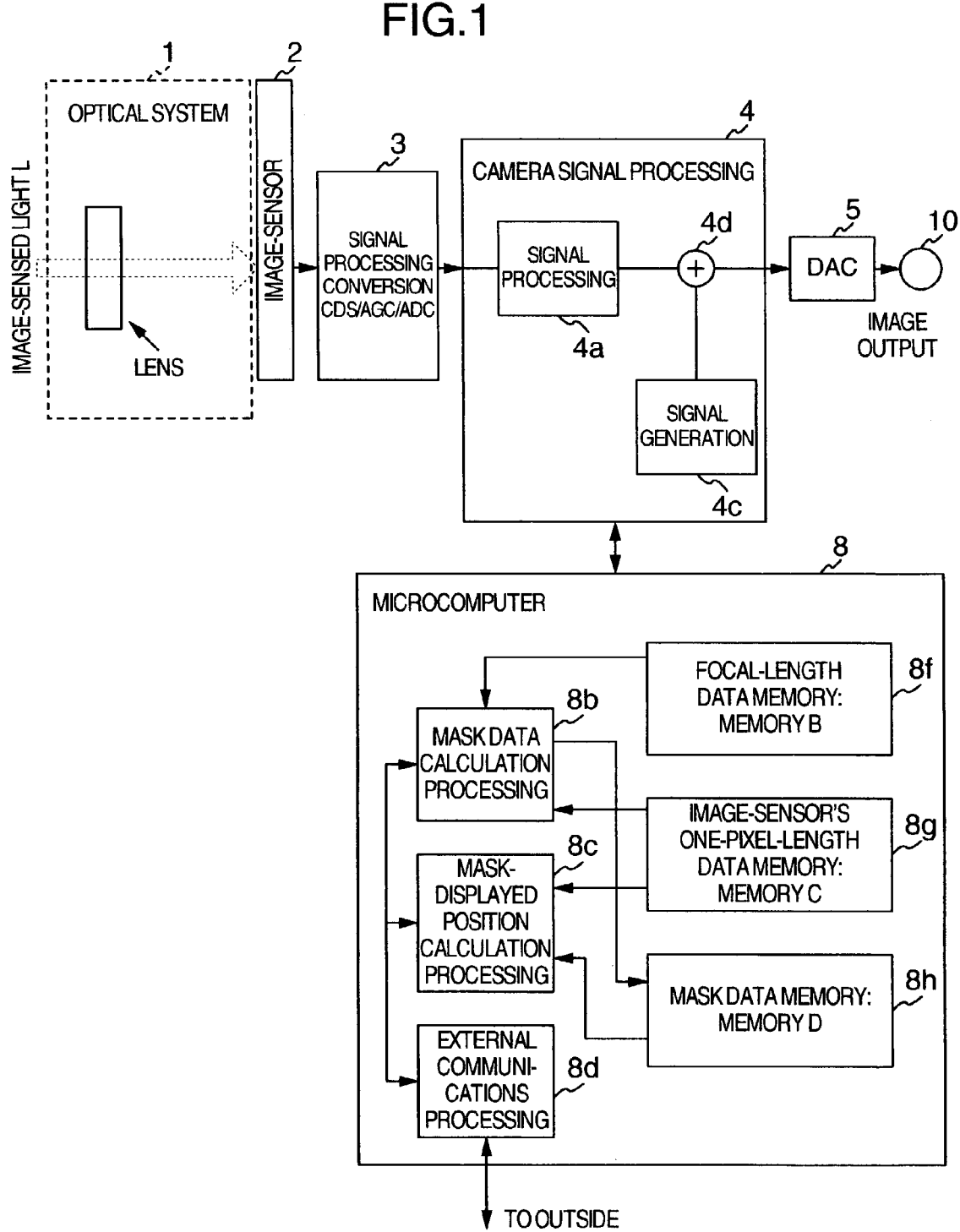
FIG. 1 is a block diagram of the surveillance camera according to the 1st embodiment of the present invention.
Figure 2:
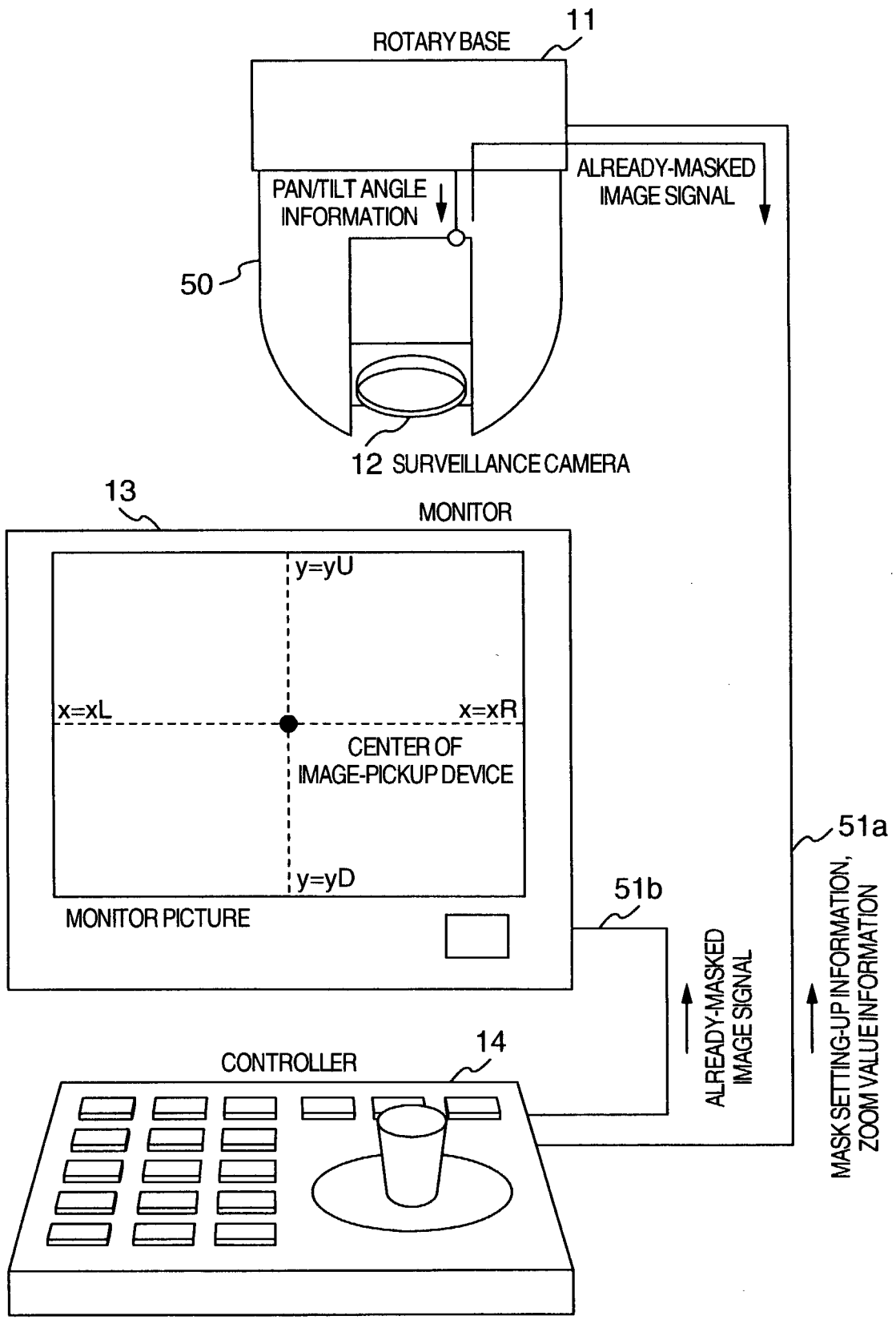
FIG. 2 is a configuration diagram of the surveillance system of the present invention.

Hereinafter, the explanation will be given below concerning the embodiments of the present invention. At first, referring to FIG. 1 and FIG. 2, the explanation will be given regarding the 1st embodiment of the present invention. FIG. 1 illustrates the configurations of a surveillance camera 12 according to the 1st embodiment of the present invention. FIG. 2 illustrates a schematic view of a surveillance camera system apparatus as a whole using this surveillance camera 12.

The surveillance camera 12 illustrated in FIG. 2 is mounted onto a rotary base 11, and is covered with a cover 50. The image signal of a photograph-target is introduced from an image-sensor 2 via an optical lens 1 fixed to an optical system of the surveillance camera 12. Next, the image signal is transmitted to the rotary base 11 and a controller section 14. Here, information needed for the system control, e.g., OSD display of a system control menu or the like, is superimposed on the image signal, then outputting the image signal to a monitor section 13. The operator operates the controller section 14 while watching the monitor section 13, thereby performing surveillance system controls such as the pan/tilt rotation of the rotary base 11, the zooming of the surveillance camera 12, and the mask setting-up over a privacy-protected range. The controller section 14, the monitor section 13, the rotary base 11, and the surveillance camera 12 transmit/receive, via communications cables 51a, 51b, information such as control information on the rotary base 11, state information on the rotary base 11, control information on the surveillance camera 12, and state information on the surveillance camera 12. As the controller section 14, a surveillance system-specific controller section, or a personal computer and a surveillance-system control software may also be used. Incidentally, although, in FIG. 2, the image signal is transmitted to the controller section 14 via the rotary base 11, the image signal may also be directly transmitted to the controller section 14 from the surveillance camera 12.

Next, referring to FIG. 1, the explanation will be given below concerning the configurations of the surveillance camera 12 according to the 1st embodiment of the present invention.

First, the optical system includes the optical lens 1 fixed onto the optical path of the surveillance camera 12, and the image-sensor 2. This image-sensor 2 is a device for converting image-sensed light (L) of the photograph-target into an electrical signal so as to output the image-sensed light as the image-pickup signal.

Second, a computation unit includes a mask data calculation processing section 8b and a mask-displayed position calculation processing section 8c. The mask data calculation processing section 8b calculates pan and tilt angles of a mask-set-up position, then sending the pan and tilt angles to a memory D. Here, the section 8b performs these calculations from pan/tilt angle information on the rotary base 11, mask-set-up coordinate information from the controller section 14, information on the focal length of the optical lens 1, and information on the size of the image-sensor's one pixel. The mask-displayed position calculation processing section 8c is a section for calculating the mask-displayed position coordinates from the pan and tilt angles of the mask-set-up position stored in the memory D, the pan/tilt angle information on the rotary base 11 at the time of displaying the mask, the focal length data, and the information on the size of the image-sensor's one pixel.

Third, a storage unit includes a memory (memory B) 8f for storing the focal length data on the optical lens, a memory (memory C) 8g for storing the size of the image-sensor's one pixel, i.e., the one pixel's lengths in the horizontal and vertical directions, and the memory (memory D) 8h for storing the mask data. This memory (D) 8h is a section for storing the pan and tilt angles of the mask-set-up position calculated by the mask data calculation processing section 8b. Furthermore, the computation unit and the storage unit are integrated into a microcomputer 8 together with an external communications processing section 8d.

Fourth, an image signal processing unit includes a signal processing conversion circuit 3, a camera signal processing circuit 4, a digital/analogue conversion (DAC) circuit 5, and an image output signal terminal 10.

The signal processing conversion circuit 3 includes a CDS circuit for eliminating a reset noise of the image-sensed signal, an automatic gain control (AGC) circuit, and an analogue/digital conversion (ADC) circuit for converting the analogue signal into a digital signal. Also, the camera signal processing circuit 4 includes a signal processing section 4a for performing a signal processing toward the image-sensed signal so as to convert the image-sensed signal into a photograph-target processing signal, a signal generating section 4c for generating a mask signal, and a signal synthesizing section 4d for synthesizing part of the image-sensed signal with the mask signal. Moreover, the digital/analogue conversion (DAC) circuit 5 is a circuit for outputting, from the image output signal terminal 10, an image output signal obtained by converting the image digital signal from the camera signal processing circuit 4 into the analogue signal.

The external communications processing section 8d included in this microcomputer 8 functions as a communications processing unit. This communications processing unit receives the control information on the surveillance camera 12, e.g., the pan/tilt angle information transmitted from the rotary base 11 regarding the rotary base 11, the zoom position, and the mask-set-up coordinates. Also, this unit transmits the state information on the surveillance camera 12 to the rotary base 11 or the controller section 14.

Hereinafter, referring to FIG. 3 and FIG. 4, the explanation will be given below concerning the operation principle of the present invention.

Figure 3:
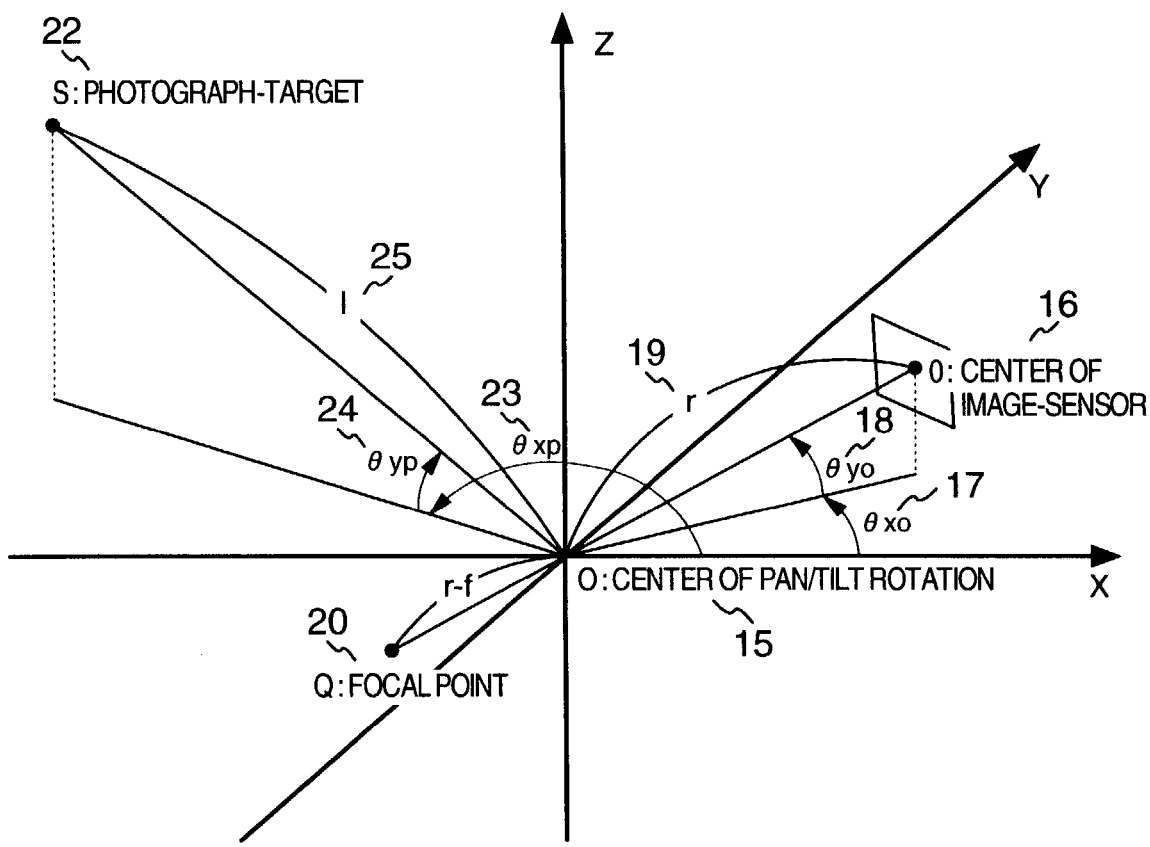
FIG. 3 is a diagram for illustrating the position relationship between the surveillance camera and a photograph-target.

FIG. 3 illustrates, within an XYZ space, the position relationship between the image-sensor 2 and a photograph-target. In the XYZ space, let the point-of-origin (O) 15 be the center of the pan/tilt rotation, and let the X-axis's positive direction be the reference of the pan and tilt angles. Also, FIG. 4 illustrates a position at which the photograph-target is projected onto the image-sensor 2. Here, the photograph-target is assumed to be a point-like material-object (S) 22.

The pan angle ($\theta$xo) 17 and the tilt angle ($\theta$yo) 18 of the surveillance camera 12 indicate, when the surveillance camera 12 mounted onto the rotary base 11 rotates, the angles of the optical axis with respect to the image-sensor 2 when seen from the pan/tilt rotation center (O) 15. Although the reference of these angles has been set up by taking the X-axis in the horizontal direction, the reference may also be set up arbitrarily. Namely, the angle information on the optical axis, which passes through the rotation center (O) of the rotatably-supported image-sensor and becomes the normal to a plane formed by the image-sensor, is defined as the pan angle ($\theta$xo) 17 and the tilt angle ($\theta$yo) 18. Namely, the angles which are formed by the rotation center (O) of the image-sensor and an intersection-point of the optical axis with the image-sensor are the pan/tilt angle information on the rotary base 11. By the way, from a design's standpoint, the optical axis, which becomes the normal to the plane formed by the image-sensor, is located such that the optical axis falls on a center (o) 16 of the image-sensor. In the present invention, although the explanation will be given assuming that this optical axis intersects with the image-sensor at the center (o) 16 of the image-sensor, the optical axis need not necessarily intersect therewith at the center (o) 16. Next, the following values are defined as are illustrated in FIG. 3: The distance (r) 19 from the pan/tilt rotation center (O) 15 to the center (o) 16 of the image-sensor 2, the distance (f) 21 from the center (o) 16 of the image-sensor 2 to the focal point (Q) 20, the pan angle ($\theta$xp) 23 and the tilt angle ($\theta$yp) 24 of the photograph-target (S) 22, the distance (l) 25 from the pan/tilt rotation center (O) 15 to the photograph-target (S) 22, the horizontal-direction one pixel's length (xu) 27 of the image-sensor, and the vertical-direction one pixel's length (yu) 28 thereof.

Figure 4:
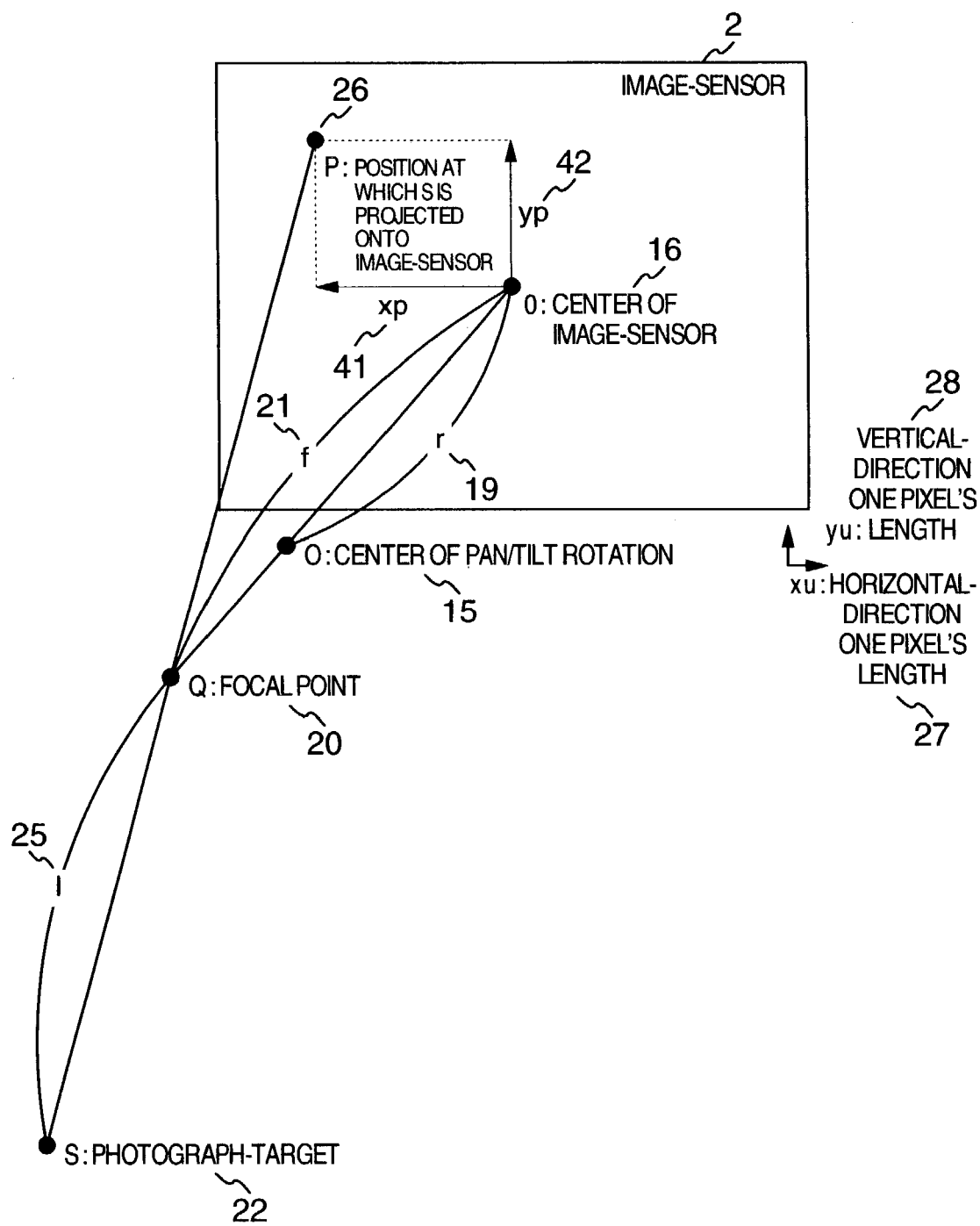
FIG. 4 is a diagram for illustrating a position at which the photograph-target is projected onto the image-sensor.

As a result, as illustrated in FIG. 4, the position (P) 26 at which the material-object (S) 22 is projected onto the image-sensor 2 can be given by Expressions 1, which will be described later, as the horizontal-direction pixels' number (xp) 41 and the vertical-direction pixels' number (yp) 42 from the center (o) 16 of the image-sensor 2. Namely, by determining the coordinate (xp, yp) as pixel information corresponding to one vertex-point of a region to be masked on an image-sensed picture, it becomes possible to substitute, for the coordinate (xp, yp), the information on the pan angle ($\theta$xp) 23 and the tilt angle ($\theta$yp) 24. Namely, these coordinates are the mask-set-up position information, the mask-displayed position information, or the pan/tilt angle information.

The relationship between the pan angle ($\theta$xp) 23 and the tilt angle ($\theta$yp) 24 and the mask-set-up position information or the mask-displayed position information (xp, yp) can also be given by Expressions 2 described later, i.e., inverse functions of Expressions 1.

By the way, usually, no surveillance system is set up very near a range that necessitates the privacy protection. As a result, the photograph-target distance (l) 25 is exceedingly longer as compared with the distance (r) 19 from the pan/tilt rotation center (O) 15 to the center (o) 16 of the image-sensor, and the distance (f) 21 from the center (o) 16 of the image-sensor to the focal point (Q) 20. Consequently, when the pan/tilt rotation center (O) 15 substantially coincides with the center of the camera, since l>>(r–f), the calculations may be perfumed by assuming that the photograph-target distance (l) 25 is infinite. In other words, the calculations may be perfumed by omitting d=(r–f)/l included in Expressions 1 and Expressions 2, which results in Expressions 4 and Expressions 5 described later. This makes it possible to reduce the calculation amount tremendously.

Incidentally, in the present embodiment, the explanation has been given by selecting, as the reference, the X-axis's positive direction in the XYZ space. The substitution of $\theta xo=\theta xo'+\theta xo$, $\theta yo=\theta yo'+\theta yo$ into the respective Expressions allows arbitrary angles $\theta xo'$, $\theta yo'$ to be selected as the reference.

Accordingly, employing Expressions 4 and Expressions 5 as the calculation Expressions, the detailed explanation will be given below regarding the operation of the 1st embodiment.

At first, the explanation will be given below concerning the mask setting-up method of setting up a mask on the image-sensed picture. Incidentally, the position (P) 26 at which a photograph-target is projected onto the image-sensor 2 is in a one-to-one correspondence with the position of the photograph-target outputted onto the monitor section 13. Accordingly, the explanation will be given defining, as (P) 26, the position coordinate of the photograph-target outputted onto the monitor section 13.

Hereinafter, instead of the above-described point-like material-object, the photograph-target is assumed to be a material-object that spreads out in size.

Figure 5:
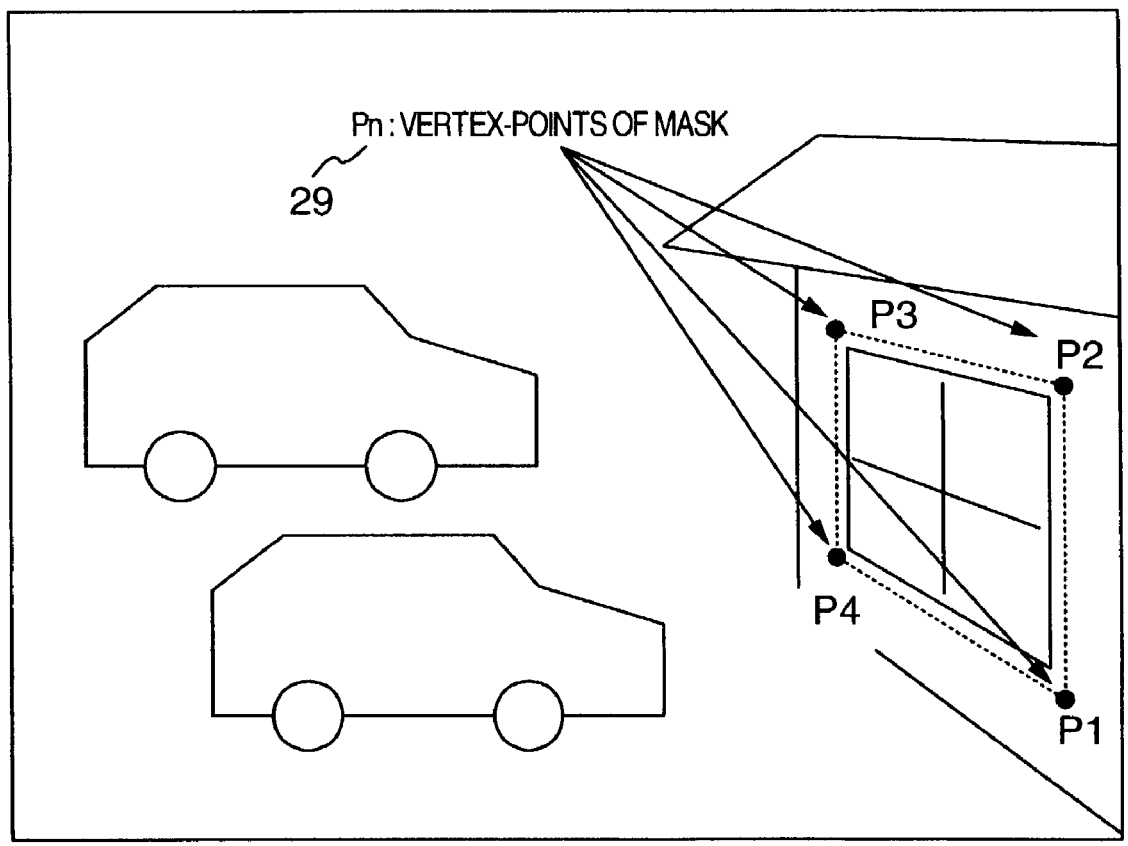
FIG. 5 is a diagram for illustrating vertex-points of a mask at the time of setting up the mask.

The operator, using the controller section 14, varies the direction and the zoom value of the surveillance camera 12 so that a privacy-protected range that the operator wishes to mask will be projected onto the monitor section 13. Next, as illustrated in FIG. 5, using the controller section 14, the operator sets up n (n: arbitrary natural number) coordinate-points (P) 26 of vertex-points of the mask as a plurality of vertex-points (Pn) 29 for defining the region to be masked, so that the privacy-protected range will be covered and concealed. At this time, the rotary base 11 transmits, to the surveillance camera 12, the pan angle ($\theta xo$) 17 and the tilt angle ($\theta yo$) 18 indicating the direction in which the camera is directed (i.e., the angles of the optical axis that passes through the rotation center of the rotatably-supported surveillance camera 12, i.e., the rotation center of the image-sensor, and becomes the normal to the plane formed by the image-sensor, namely, substantially the center of the image-sensor). Moreover, the surveillance camera 12 performs the calculation processing by Expressions 5 at the mask data calculation processing section 8b, using the following data: The information on the horizontal-direction one pixel's length (xu) 27 of the image-sensor and the vertical-direction one pixel's length (yu) 28 thereof which have been stored in the memory (C) 8g, the data on the focal length (f) 21 stored in the memory (B) 8f, and the coordinates of the respective vertex-points Pn (n=1, 2, 3, . . . ) on the image-sensor 2 which have been instructed by the controller section 14. The results of this calculation, i.e., the pan angles ($\theta xpn$) 23 and the tilt angles ($\theta ypn$) 24, are angle information ($\theta xp1$, $\theta yp1$, $\theta xp2$, $\theta yp2$, . . . , $\theta xpn$, $\theta ypn$) which indicates the respective vertex-points. Then, the resultant angle information is stored into the memory (D) 8h as the mask data.

Figure 6:
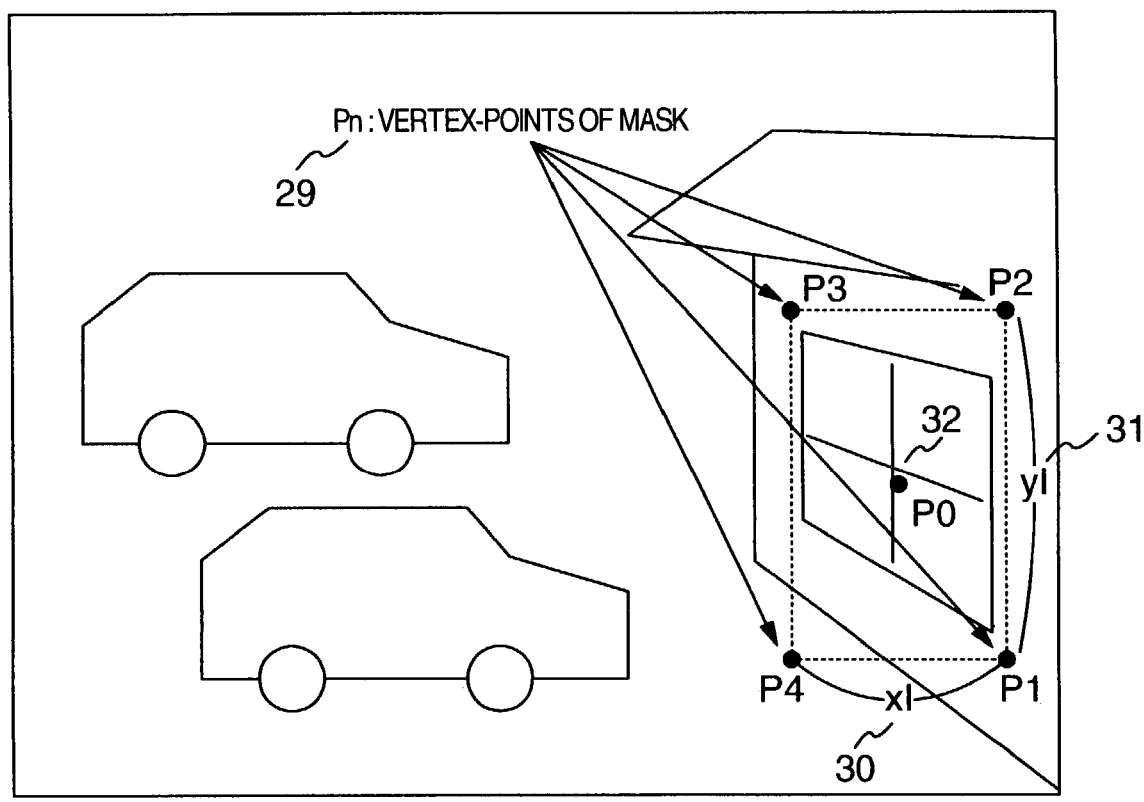
FIG. 6 is a diagram for illustrating the vertex-points of the mask at the time of setting up the mask when the mask configuration is set up as only a horizontal× vertical rectangle.

Otherwise, as illustrated in FIG. 6, the operator may set up the mask configuration as a fixed horizontal x vertical rectangle, then storing, as the mask data, the central coordinate (P0) 32, the horizontal-direction length (xl) 30, and the vertical-direction length (yl) 31.

Next, the explanation will be given below regarding the mask displaying method of masking the privacy-protected range on the image-sensed picture.

The surveillance camera 12 performs the calculation processing by Expressions 4 at the mask-displayed position calculation processing section 8c, using the following data: The pan angle ($\theta xo$) 17 and the tilt angle ($\theta yo$) 18 of the surveillance camera 12 instructed and transmitted by the controller section 14, the focal length (f) 21, the respective mask data set up (i.e., the pan angles ($\theta xpn$) and the tilt angles ($\theta ypn$) of the respective vertex-points of the mask), and the data stored in the memory (C). Thus, the results of this calculation are determined which, as illustrated in FIG. 4, are the coordinates (xpn) 41 and (ypn) 42 of the respective vertex-points (Pn) 29 of the mask on the picture of the image-sensor 2.

Furthermore, these mask-displayed coordinates (xpn, ypn) 41, 42 are outputted to the camera signal processing circuit 4. The camera signal processing circuit 4, at the signal synthesizing section 4d, synthesizes the mask-displayed position part of the image-pickup signal with the mask signal generated at the signal generating section 4c, then processing the synthesized signal as a masked image that will be described later.

Here, referring to FIG. 7, the concrete explanation will be given below regarding the masking method of masking the image-sensed picture on which there is formed a region to be masked. Here, the explanation will be given on the image-sensed picture displayed onto the monitor section 13, and the region to be masked is the one calculated at the mask-displayed position calculation processing section 8c. FIG. 7(*a*) illustrates, on the monitor picture, the region to be masked. Here, the closed region surrounded by P1, P2, P3, and P4 is to be masked. FIG. 7(*b*) illustrates the mask detection signal on one horizontal-line basis. FIG. 7(*c*) illustrates an image signal of the image-sensed picture from the image-sensor 2. FIG. 7(*e*) illustrates the image signal of the masked image-sensed picture which is sent out from the image output terminal 10 after via the signal synthesizing section 4d of the camera signal processing circuit 4.

As illustrated in FIG. 7(*a*) to FIG. 7(*e*), the signal for indicating the vertex-points that form the region to be masked is generated as follows: At first, on each horizontal-line basis, the signal generating section 4c determines intersection-points of each line-segment and the region surrounded by (Pn) 29, then generating the mask signal that has the following characteristic: The mask signal is at a Low level from the head of each horizontal-line to the 1st intersection-point, and is at a High level from the 1st intersection-point to the 2nd intersection-point, and is at the Low level from the 2nd intersection-point to the end of each horizontal-line. Hereinafter, the High/Low levels are toggled (i.e., alternately supplied) for each intersection-point. Next, when the mask signal is at the High level, the signal synthesizing section 4d synthesizes the image signal with another image-signal synthesizing signal at a 0-to-100 ratio, thereby performing the display of the mask.

Figure 8A:
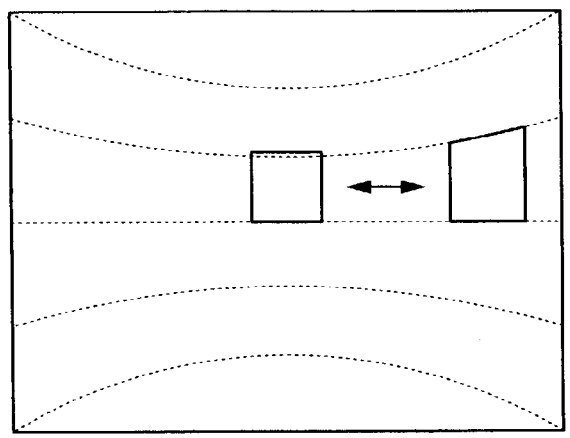
FIGS. 8A, 8B, and 8C are diagrams for illustrating displacements of photograph-targets caused by a pan/tilt rotation.
Figure 8B:
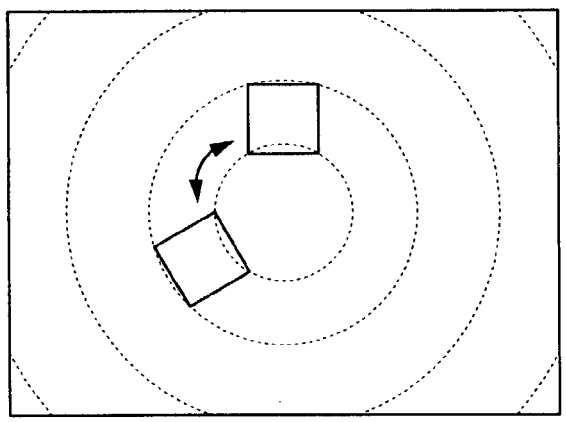

In the conventional methods of managing the mask data by the coordinates, it was impossible to store, as accurate data, the arbitrary configurations of the mask area caused by the camera's direction change as illustrated in FIG. 8A and FIG. 8B, and the configuration change caused by the position of the photograph-target. Also, it was also impossible to store the accurate data in the case where the configuration is greatly rotated by the pan rotation, e.g., the case where the photograph-target exists directly below or above the surveillance camera 12. In the 1st embodiment of the present invention, however, consideration has been given to the angle relationship between the rotation center 15 of the surveillance camera 12 and the image-sensor 2. Accordingly, even at the angle at which the masked picture could not be formed conventionally, the masking exhibits a significant effect. Furthermore, the management of the mask data like this by the angles of the respective vertex-points makes it possible to store, into the memory (D) 8h, the positions indicating the more accurate region to be masked.

Figure 8C:
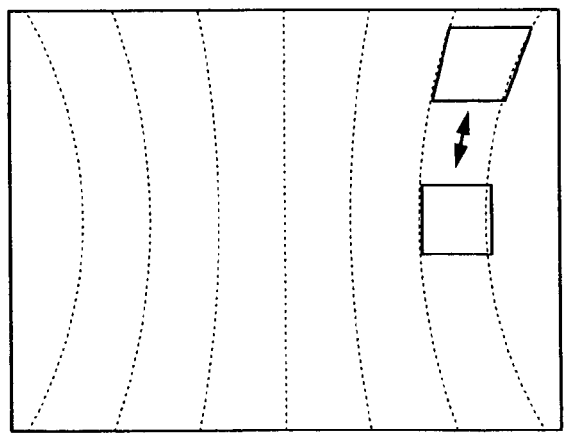

In the present invention, at the time of displaying the mask, it becomes possible to accurately determine the positions of the respective vertex-points on the picture every time the direction of the surveillance camera 12 is changed. Namely, as illustrated in FIG. 8B, even in the case of the rotation of the privacy-protected range caused by the pan rotation near the location where the tilt angle is equal to 90° (i.e., directly below) or −90° (i.e., directly above), it becomes always possible to form the mask having an arbitrary configuration. This condition allows the implementation of a secure display of the masked picture. Also, the masking exhibits a significant effect without being influenced by the configuration changes of the mask area when, as illustrated in FIG. 8A and FIG. 8C, the photograph-targets have been displaced up to the picture edges. This condition allows the setting-up of the mask area to be implemented at a location other than the picture center.

Figure 9:
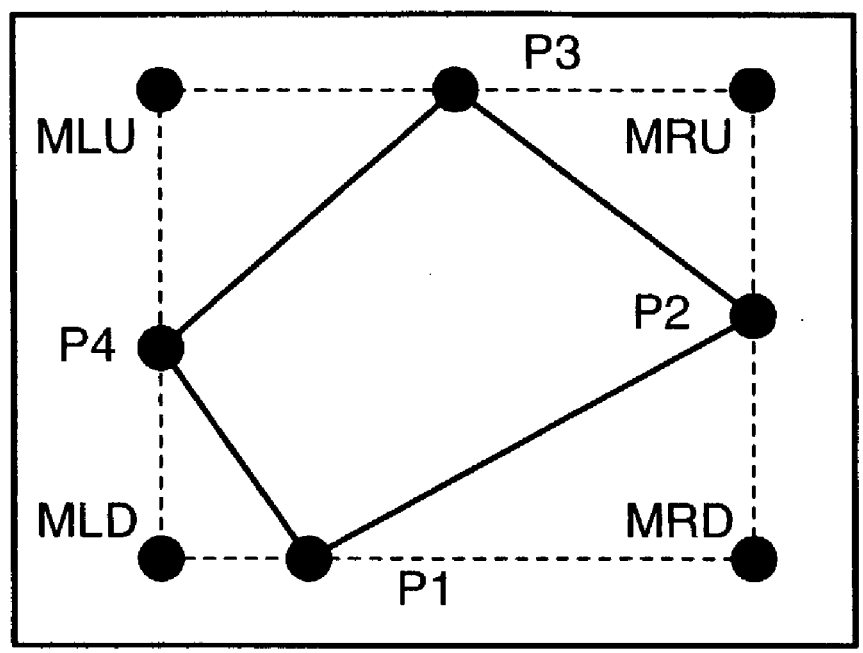
FIG. 9 is a diagram for illustrating a mask-displayed portion when the mask configuration is set up as only the horizontal× vertical rectangle.

FIG. 9 illustrates a method of simplifying the display of a mask on an image-sensed picture, which results from applying the 1st embodiment.

If only a horizontal× vertical rectangle can be mask-displayed as the mask from the configuration of the signal generating section 4c, letting the minimum value of xpn be MIN (xpn), the maximum value of xpn be MAX (xpn), the maximum value of ypn be MAX (ypn), and the minimum value of ypn be MIN (ypn), the region surrounded by the following points is mask-displayed: The point MRU at which x=MIN (xpn), y=MAX (ypn), the point MRD at which x=MIN (xpn), y=MIN (ypn), the point MLD at which x=MAX (xpn), y=MIN (ypn), and the point MLU at which x=MAX (xpn), y=MAX (ypn).

Namely, in this method, letting the transverse direction be the X-axis and the longitudinal direction be the Y-axis on the picture of the image-sensor 2, the rectangular closed region is masked, then being sent out as the image-sensed picture illustrated in FIG. 9. Here, the rectangular closed region is a region formed by X-axis-parallel straight lines (i.e., the X-axis-parallel straight lines connecting MLD and MRD, MLU and MRU) and Y-axis-parallel straight lines (i.e., the Y-axis-parallel straight lines connecting MLD and MLU, MRD and MRU) that circumscribe a plurality of vertex-points (P1, P2, P3, P4) 29 forming the region to be masked.

In this case, although the display accuracy with which the mask is displayed is inferior to the one in the 1st embodiment, there exists an advantage of being capable of making simpler the configuration of the camera signal processing circuit 4.

Next, referring to FIG. 10, the explanation will be given below concerning the 2nd embodiment.

Figure 10:
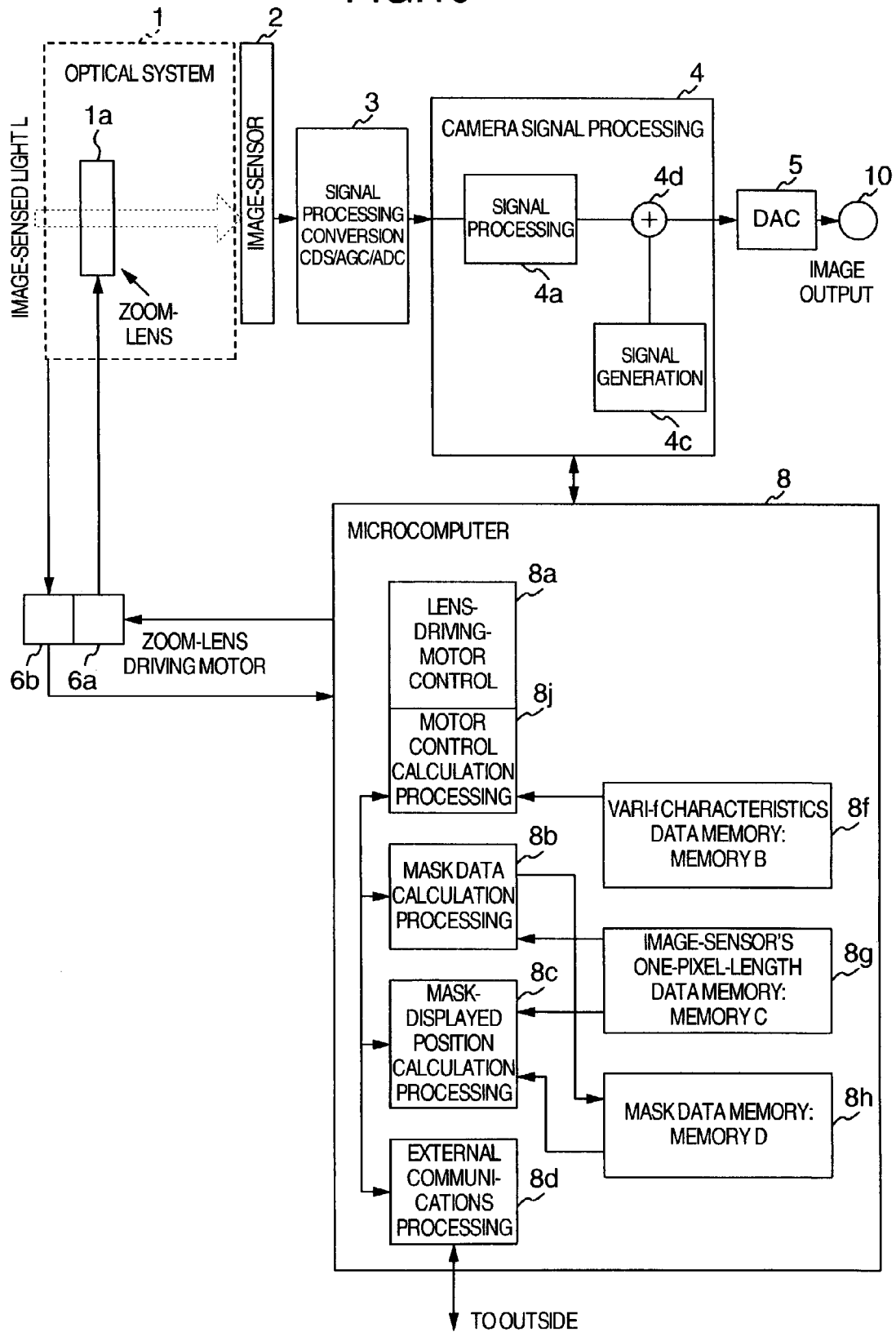
FIG. 10 is a block diagram of the surveillance camera according to the 2nd embodiment of the present invention.

A surveillance camera 12 illustrated in FIG. 10 is equivalent to the surveillance camera 12 explained in the 1st embodiment. The rotary base 11, the controller section 14, the monitor section 13, and the communications unit among them are the same as those in the 1st embodiment.

Concerning the 2nd embodiment, the explanation will be given below mainly regarding the points that differ from those in the 1st embodiment.

First, an optical system includes a zoom-lens 1a for changing the picture-angle, and an image-sensor 2.

Second, a zoom-lens driving motor 6a performs the driving of the zoom-lens in accordance with an instruction from a lens-driving-motor control section 8a. This zoom-lens driving motor 6a receives, at a microcomputer (hereinafter, referred to as "micro computer") 8, an instruction from the controller section 14 existing outside the surveillance camera 12. Then, the motor 6a performs the driving in accordance with the control signal, thereby controlling the picture-angle of the image-sensed picture at a desired one. Incidentally, a zoom-lens position detecting section 6b issues position-detected information on the zoom-lens 1a.

Third, a computation unit includes a motor control calculation processing section 8j set up on the lens-driving-motor control section 8a, a mask data calculation processing section 8b, and a mask-displayed position calculation processing section 8c. This calculation processing section 8j is a unit for calculating the focal length (f) 21 from data stored in a memory (B) 8f. The mask data calculation processing section 8b calculates pan and tilt angles of a mask-set-up position from pan/tilt angle information on the rotary base 11, mask-set-up coordinate information, the information on the focal length, and information on the size of the image-sensor's one pixel stored in a memory (C). The mask-displayed position calculation processing section 8c is a section for calculating the mask-displayed position coordinates from the pan and tilt angles of the mask-set-up position, the pan/tilt angle information on the rotary base 11 at the time of displaying the mask, the focal length information at the time of displaying the mask, and the information on the size of the image-sensor's one pixel.

Figure 11:
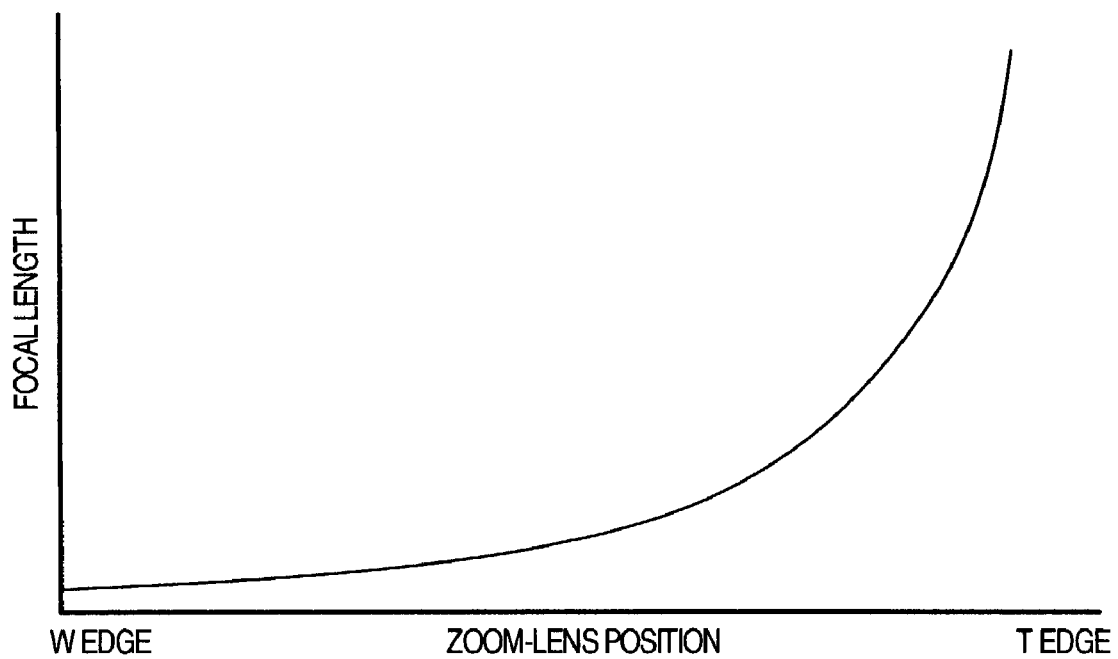
FIG. 11 is a diagram for illustrating the VARI-f value characteristics data.

Fourth, a storage unit includes the following sections: The memory (memory B) 8f for storing VARI-f value characteristics data (FIG. 11) for indicating the relationship between the zoom-lens position and the focal length, the memory (memory C) 8g for storing the size of the image-sensor's one pixel, and a memory (memory D) 8h for storing the mask data. This memory (memory D) 8h is a section for storing the pan and tilt angles of the mask-set-up position calculated by the mask data calculation processing section 8b. Furthermore, the computation unit and the storage unit are integrated into the microcomputer 8 together with an external communications processing section 8d.

Fifth, an image signal processing unit is a unit that is equivalent to the fourth image signal processing unit explained in the 1st embodiment. Namely, the image signal processing unit includes a signal processing conversion circuit 3, a camera signal processing circuit 4, a digital/analogue conversion (DAC) circuit 5, and an image output signal terminal 10.

The signal processing conversion circuit 3, the digital/analogue conversion (DAC) circuit 5, and the image output signal terminal 10 are the same as those in the 1st embodiment in their internal configurations as well as their functions.

The explanation will be given below concerning the mask setting-up method of setting up a mask on the image-sensed picture.

As is the case with the 1st embodiment, the operator, using the controller section 14, varies the is direction and the zoom value of the surveillance camera 12 so that a privacy-protected range that the operator wishes to mask will be projected onto the monitor section 13. Next, as illustrated in FIG. 5, using the controller section 14, the operator sets up n (n: arbitrary natural number) coordinate-points (P) 26 of vertex-points of the mask as a plurality of vertex-points (Pn) 29 for defining the region to be masked, so that the privacy-protected range will be covered and concealed. At this time, the rotary base 11 transmits, to the surveillance camera 12, the pan angle (θxo) 17 and the tilt angle (θyo) 18 indicating the direction in which the camera is directed.

Here, the surveillance camera 12 calculates the focal length (f) 21 at the calculation processing section 8j set up on the lens-driving-motor control section 8a, using the information from the zoom-lens position detecting section 6b at this time and the VARI-f value characteristics data stored in the memory 8f. Moreover, the surveillance camera 12 performs the calculation processing by Expressions 5 at the mask data calculation processing section 8b, using this calculated data on the focal length and the coordinates of the respective vertex-points Pn (n=1, 2, 3, . . . ) on the image-sensor 2 which have been instructed by the controller section 14. The results of this calculation, i.e., the pan angles (θxpn) 23 and the tilt angles (θypn) 24, are angle information (θxp1, θyp1, θxp2, θyp2, . . . , θxpn, θypn) which indicates the respective vertex-points. Then, the resultant angle information is stored into the memory (D) 8h as the mask data.

In this embodiment, in the camera as well where the installment of the movable zoom-lens 1a allows the zoom magnification to be arbitrarily changed, the focal length (f) of the optical system is calculated in correspondence with the zoom state thereof. This condition makes it possible to store, into the memory (D) 8h, the positions indicating the region to be masked in a state where a clear image-sensed picture has been obtained.

Next, the explanation will be given below regarding the mask displaying method of displaying the mask on the image-sensed picture.

The surveillance camera 12 calculates the focal length (f) 21 at the calculation processing section 8j set up on the lens-driving-motor control section 8a, using the pan angle (θxo) 17 and the tilt angle (θyo) 18 of the surveillance camera 12 instructed and transmitted by the controller section 14, the information from the zoom-lens position detecting section 6b at this time, and the VARI-f value characteristics data stored in the memory (B).

Moreover, as is the case with the 1st embodiment, the surveillance camera 12 performs the calculation processing by Expressions 4 at the mask-displayed position calculation processing section 8c, using this calculated focal length (f) 21, the respective mask data set up (i.e., the pan angles (θxpn) and the tilt angles (θypn) of the respective vertex-points of the mask), and the data stored in the memory (C). Thus, the results of this calculation are determined which, as illustrated in FIG. 4, are the coordinates (xpn) 41 and (ypn) 42 of the respective vertex-points (Pn) 29 of the mask on the picture of the image-sensor 2.

Furthermore, as is the case with the 1st embodiment, these mask-displayed coordinates (xpn, ypn) 41, 42 are outputted to the camera signal processing circuit 4. The camera signal processing circuit 4, at the signal synthesizing section 4d, synthesizes the mask-displayed position part of the image-pickup signal with the mask signal generated at the signal generating section 4c, then sending out the synthesized signal as a masked image.

In this 2nd embodiment, in the camera as well where the installment of the movable zoom-lens 1a allows the zoom magnification to be arbitrarily changed, the focal length (f) of the optical system is calculated in correspondence with the zoom state thereof. This condition makes it possible to display the masked picture with a clear image. Naturally, even in the case of the rotation of a privacy-protected range caused by the pan rotation near the location where the tilt angle is equal to 90° (i.e., directly below) or −90° (i.e., directly above), it becomes possible to implement a secure display of the masked picture. Also, the masking exhibits a significant effect without being influenced by a configuration change of the mask area when the photograph-target has been displaced up to the picture edge. This condition allows the setting-up of the mask area to be implemented even at a location other than the picture center with the image-sensed picture that is clearer than the one in the 1st embodiment.

Next, referring to FIG. 12, the explanation will be given below concerning the 3rd embodiment.

The 3rd embodiment employs Expressions 1 and Expressions 2 explained in the above-described operation principle. This condition provides a higher-accuracy masking method of masking an image-sensed picture.

Figure 12:
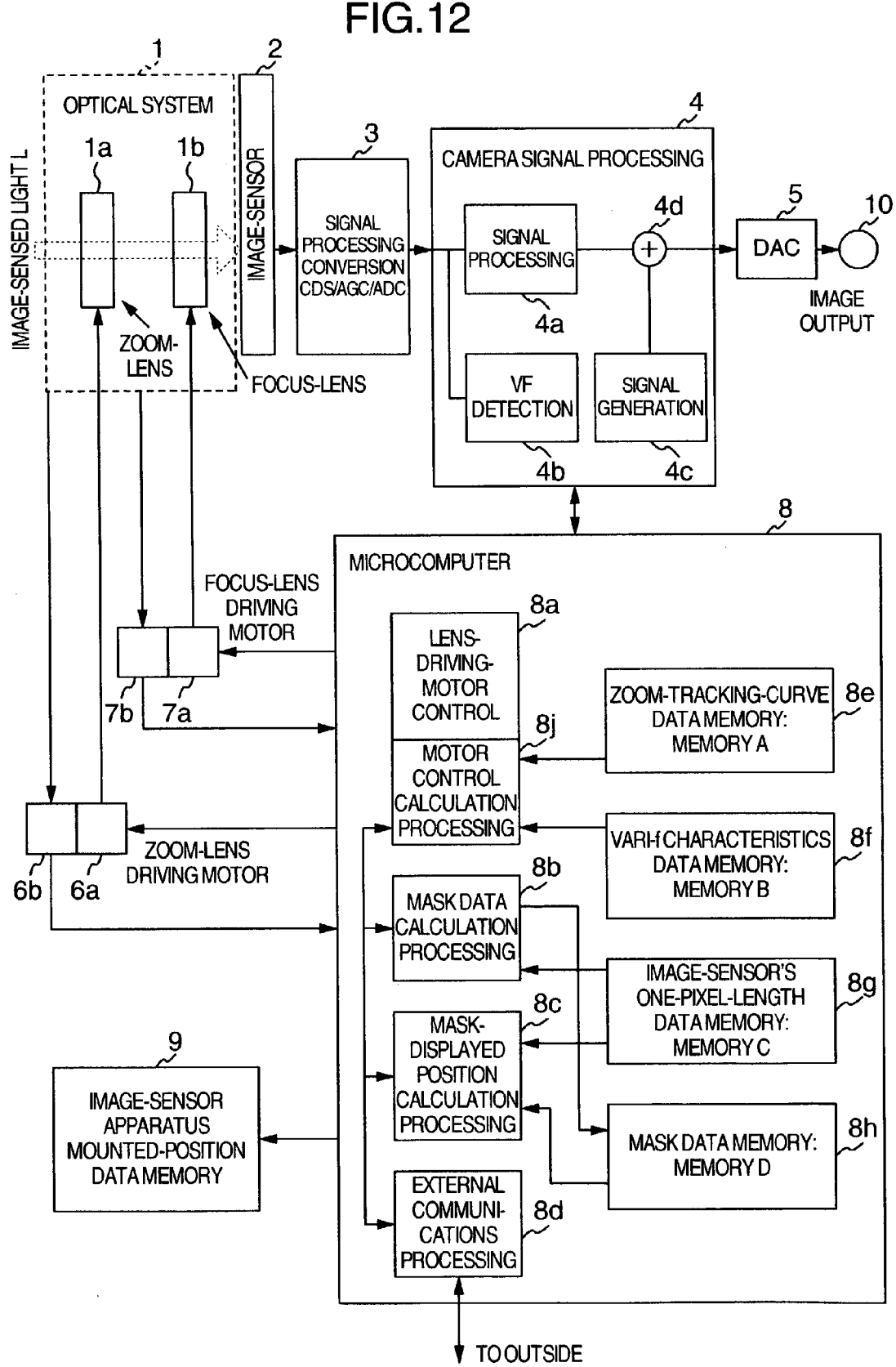
FIG. 12 is a block diagram of the surveillance camera according to the 3rd embodiment of the present invention.

A surveillance camera 12 illustrated in FIG. 12 is equivalent to the surveillance camera 12 explained in the 2nd embodiment. The rotary base 11, the controller section 14, the monitor section 13, and the communications unit among them are the same as those in the 1st embodiment.

In the 3rd embodiment, the points that differ greatly from the 2nd embodiment are as follows: The calculation Expressions are more strict than those employed in the 2nd embodiment, and there is provided a distance-measuring unit for measuring the distance from the pan/tilt rotation center to a photograph-target.

First, an optical system includes a zoom-lens 1a for changing the picture-angle, a focus-lens 1b that is added as a lens whose focus is to be achieved, and an image-sensor 2.

Second, there are added a focus-lens driving motor 7a for performing the driving of the focus-lens, and a focus-lens position detecting section 7b. This focus-lens driving motor 7a is a motor for achieving an image focus in accordance with a just-focus control signal from a signal processing circuit that will be described later.

Third, a computation unit includes a motor control calculation processing section 8j set up on a lens-driving-motor control section 8a, a mask data calculation processing section 8b, and a mask-displayed position calculation processing section 8c. Here, in addition to the function of performing the above-described calculation in the 2nd embodiment, the calculation processing section 8j additionally includes a function of calculating the distance from the pan/tilt rotation center to the photograph-target (i.e., photograph-target distance data), using the following information: Data stored in a memory section 8e, and the position-detected information detected from the focus-lens position detecting section 7b and the zoom-lens position detecting section 6b. This calculating function works as the distance-measuring unit. Also, the mask data calculation processing section 8b and the mask-displayed position calculation processing section 8c employ the calculation Expressions that differ from those employed in the 2nd embodiment.

The mask data calculation processing section 8b calculates pan and tilt angles of a mask-set-up position by the calculation of Expressions 2, using the following information in this embodiment: Information on the distance from the pan/tilt rotation center to the image-sensor, which is stored in an image-pickup apparatus mounted-position data storage unit 9, and the information on the photograph-target distance data, in addition to the information used in the 2nd embodiment, i.e., the pan/tilt angle information on the rotary base 11, the mask-set-up coordinate information, the information on the focal length, and the information on the size of the image-sensor's one pixel stored in the memory (C).

The mask-displayed position calculation processing section 8c calculates the mask-displayed position coordinates by the calculation of Expressions 1, using the following information: Information read out from a mask data memory section (memory D) 8h, and the information stored in the image-pickup apparatus mounted-position data storage unit 9, in addition to the information used in the 1st embodiment, i.e., the pan/tilt angle information on the rotary base 11, the information on the focal length at the time of displaying the mask, and the information on the size of the image-sensor's one pixel.

Figure 13:
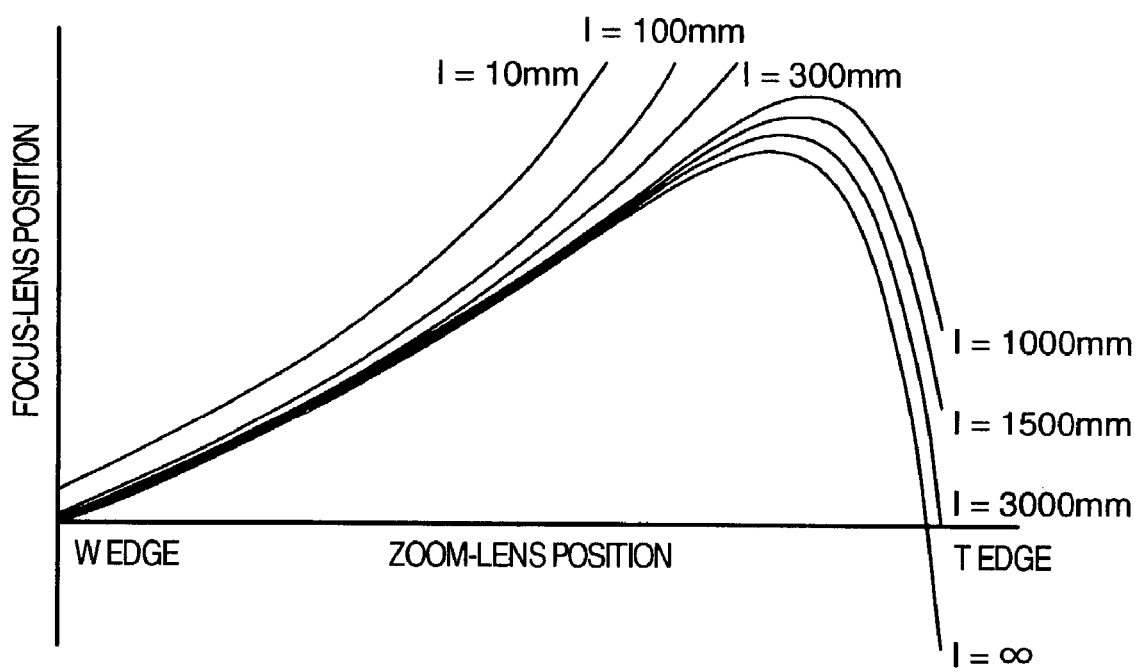
FIG. 13 is a diagram for illustrating zoom tracking curve data.
Figure 14:
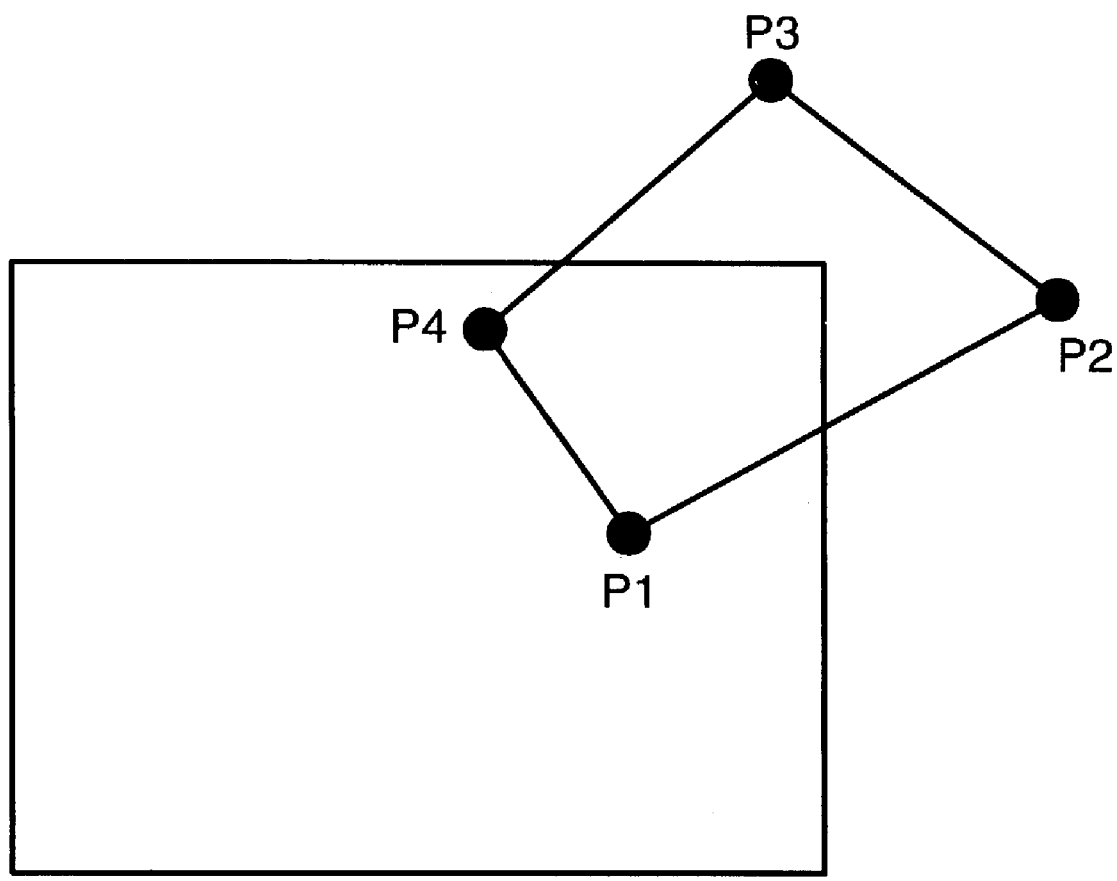
FIG. 14 is a diagram for illustrating the vertex-points of the mask at the time of displaying the mask.

Fourth, a storage unit stores zoom tracking curve data, which has been illustrated in FIG. 13, in a memory (A) 8e within a microcomputer 8. This zoom tracking curve data is data for determining the relationship among the photograph-target distances with respect to a zoom-lens position and the focus-lens position at the time of the just-focus. Also, the mask data memory (D) 8h stores not only the data explained in the 2nd embodiment but also the photograph-target distance data. As the other configuration, the mounted-position data memory 9 of the surveillance camera 12 is additionally located.

Fifth, in an image signal processing unit, a VF detector 4b is provided in a camera signal processing circuit 4. The VF detector 4b detects photograph-target luminance edge-component information for achieving the focus (hereinafter, referred to as "VF detection data"), then transmitting the VF detection data to the lens-driving-motor control section 8a within the microcomputer 8.

The other configurations, e.g., a lens driving section 6a, the lens driving section 7a, the lens position detecting section 6b, a signal processing conversion circuit 3, a DAC circuit 5, and an external communications processing section 8d within the microcomputer 8, are the same as those in the 2nd embodiment.

Hereinafter, the explanation will be given below concerning the mask setting-up method in the 3rd embodiment. As illustrated in FIG. 5 explained in the 2nd embodiment, the operator sets up the mask as a plurality of vertex-points (Pn) 29 for defining a region to be masked. At this time, the rotary base 11 transmits, as the pan/tilt angle information and to the surveillance camera 12, the pan angle (θxo) 17 and the tilt angle (θyo) 18 indicating the direction in which the camera is directed. Here, the surveillance camera 12 calculates the focal length (f) 21 at the calculation processing section 8j set up on the lens-driving-motor control section 8a, using the information from the zoom-lens position detecting section 6b at this time and the VARI-f value characteristics data stored in the memory 8f. Also, the surveillance camera 12 calculates the photograph-target distance (l) 25 (i.e., the distance to the material-object existing within the privacy-protected range) determined from the zoom position, the focus position, and the zoom tracking curve data. Moreover, the surveillance camera 12 performs the calculation processing by Expressions 2 at the mask data calculation processing section 8b, using the following information: This calculated data on the photograph-target distance, the information on the pan angle (θxo) 17 and the tilt angle (θyo) 18, the information on the focal length, and the coordinates of the respective vertex-points Pn (n=1, 2, 3, . . . ) on the image-sensor 2 which have been instructed by the controller section 14.

The results of this calculation, i.e., the pan angles (θxpn) 23 and the tilt angles (θypn) 24, are angle information (θxp1, θyp1, θxp2, θyp2, . . . , θxpn, θypn) which indicates the respective vertex-points. Then, the resultant angle information is stored into the memory (D) 8h as the-mask data. Simultaneously, the photograph-target distance (l) 25 (i.e., the photograph-target distance data) is also stored into the memory (D) 8h as the mask data.

In this 3rd embodiment, the mounted-position information on the surveillance camera 12 and the photograph-target distance data are also used. This condition makes it possible to store, as more accurate data than the one in the 2nd embodiment, the arbitrary configurations of the mask area and the configuration change caused by the position of the photograph-target. Consequently, the 3rd embodiment stores, into the memory (D) 8h, the positions indicating the more accurate region to be masked.

Next, the explanation will be given below regarding the mask displaying method in the 3rd embodiment of masking the privacy-protected range on the image-sensed picture.

The surveillance camera 12 calculates the focal length (f) 21 at the calculation processing section 8j set up on the lens-driving-motor control section 8a, using the pan angle (θxo) 17 and the tilt angle (θyo) 18 of the surveillance camera 12 instructed and transmitted by the controller section 14, the information from the zoom-lens position detecting section 6b at this time, and the VARI-f value characteristics data stored in the memory (B). Moreover, the surveillance camera 12 performs the calculation processing by Expressions 1 at the mask-displayed position calculation processing section 8c, using the following data: This calculated focal length (f) 21, the respective mask data set up (i.e., the pan angles (θxpn) and the tilt angles (θypn) of the respective vertex-points of the mask), the photograph-target distance data, and the data stored in the memory (C). Thus, the results of this calculation are determined which are the coordinates (xpn) 41 and (ypn) 42 of the respective vertex-points (Pn) 29 of the mask on the image-sensor 2.

Furthermore, these mask-displayed coordinates (xpn, ypn) 41, 42 are outputted to the camera signal processing circuit 4. The camera signal processing circuit 4, at the signal synthesizing section 4d, synthesizes the mask-displayed position part of the image-pickup signal with the mask signal generated at the signal generating section 4c, then sending out the synthesized signal as a masked image.

Incidentally, in the present embodiment, the above-described method of determining the photograph-target distance from the focus-lens position at the time of the just-focus, the zoom-lens position, and the zoom tracking curve data has been employed as the distance-measuring unit. However, some other method, e.g., a method of irradiating the photograph-target with near-infrared or infrared light to measure the distance from an angle at which the reflected light returns, may be employed as the distance-measuring unit.

At the time of displaying the mask in this 3rd embodiment, it becomes possible to determine, more accurately than the 2nd embodiment, the positions of the respective vertex-points on the picture every time the direction of the surveillance camera 12 is changed. Consequently, in the 3rd embodiment, even in the case of the rotation of the privacy-protected range caused by the pan rotation at the location directly below or above the camera, it becomes possible to form the mask having an arbitrary configuration that is more accurate than the 2nd embodiment. This condition allows the implementation of a securer display of the masked picture, and also allows the setting-up of the mask area to be implemented even at the picture edge with the mask having a more complicated configuration.

Next, using the 4th embodiment of the present invention and referring to FIGS. 14 to 17, the explanation will be given below concerning the case where a range to be masked extends off the picture-frame. In the above-described 1st to 3rd embodiments, the range to be masked exists within the picture-frame at the time of displaying the mask. However, when reading out, from the memory (D) 8h, positions indicating the region to be masked and displaying the positions, there occurs the case illustrated in FIG. 14. In the case like this in FIG. 14 where part of the region to be masked extends off the picture-frame, intersection-points of the line-segments, which are configured by the respective vertex-points (Pn) 29, and the picture-frame are determined, then limiting the display of the mask area by the intersection-points.

Figure 15:
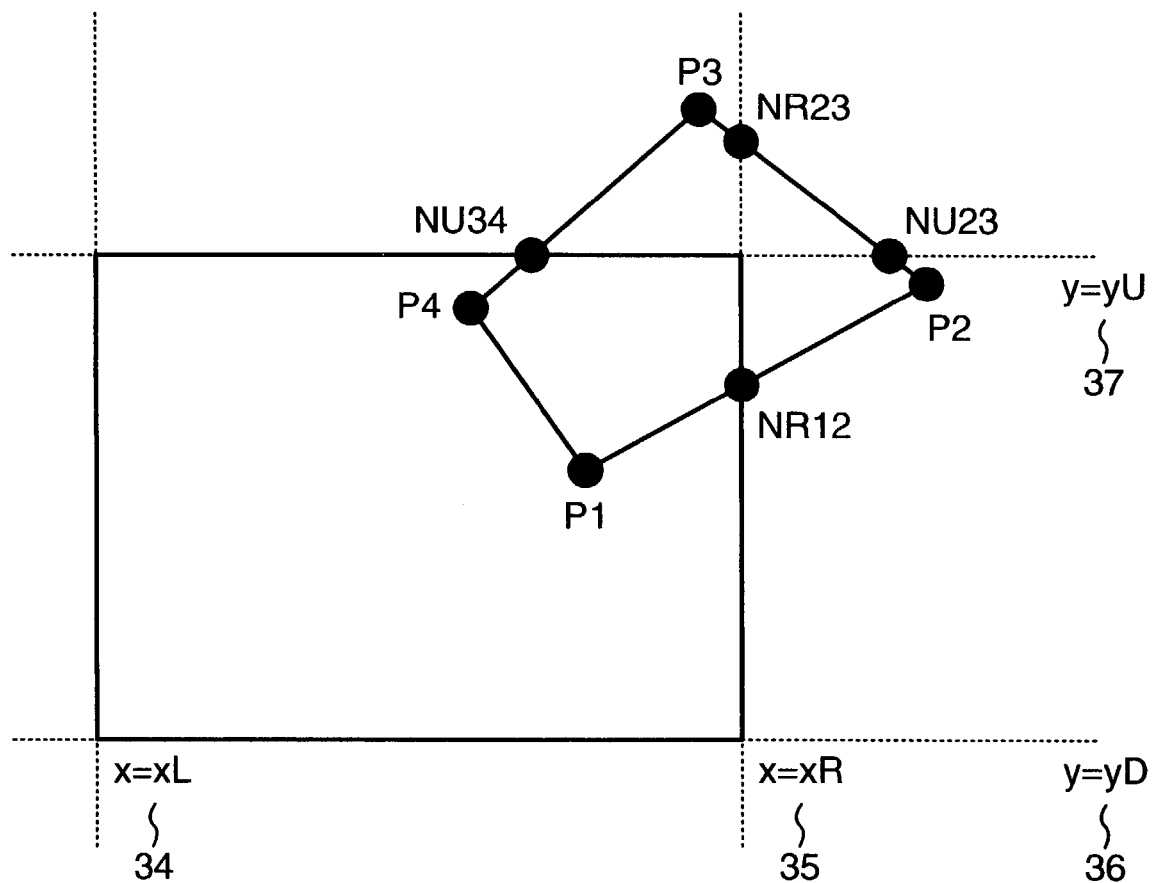
FIG. 15 is a diagram for illustrating intersection-points formed by line-segments of the mask vertex-points and straight lines including the picture-frame.
Figure 16:
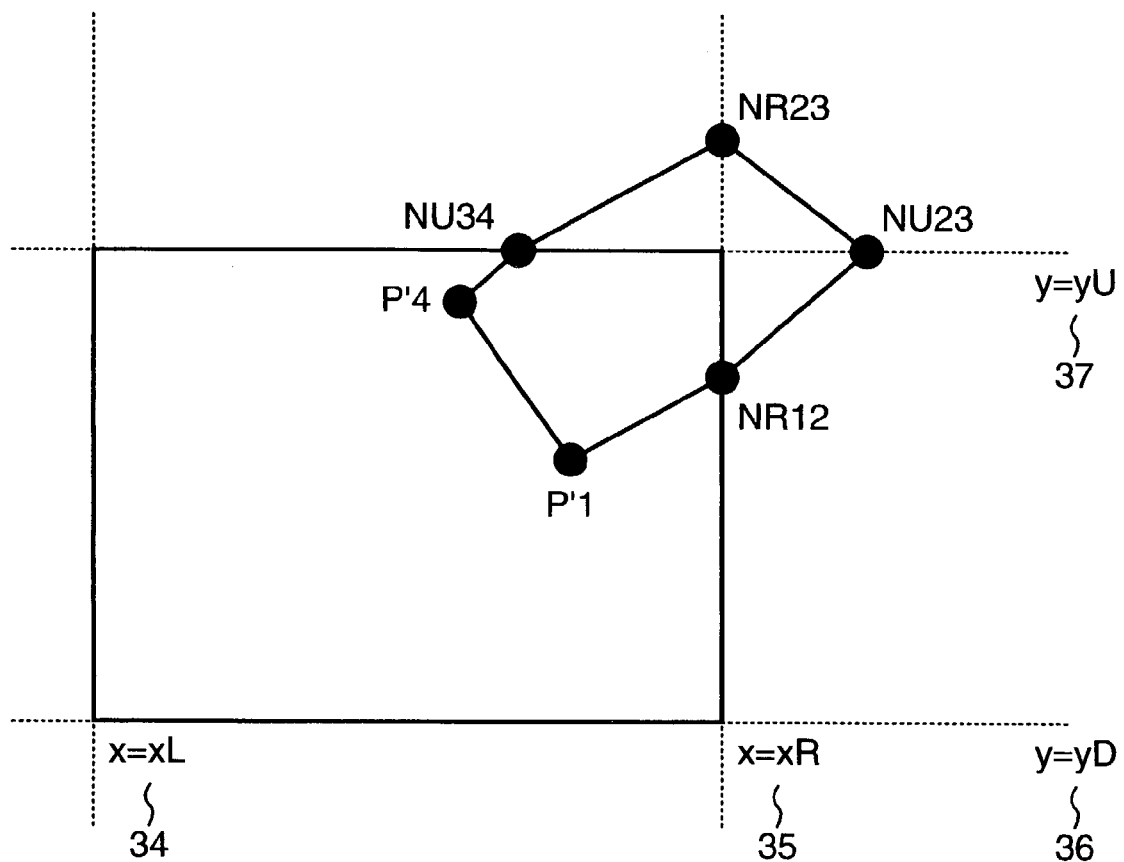
FIG. 16 is a diagram for illustrating the mask vertex-points within the picture-frame at the time of displaying the mask.

As illustrated in FIG. 15, the intersection-points (NWst) 33 (W=L, R, D, U, st=12, 23, . . . , n−1 n, n 1) of the line-segments PsPt {(s, t)=(1, 2), (2, 3), . . . , (n−1, n), (n, 1)} and a straight line (x=xL) 34 including the left picture-frame, a straight line (x=xR) 35 including the right picture-frame, a straight line (y=yD) 36 including the down picture-frame, and a straight line (y=yU) 37 including the up picture-frame are determined, using Expressions 3 that will be described later. These intersection-points are the intersection-points NU34, NU23 with the up picture-frame straight line (y=yU) 37, and the intersection-points NR12, NR23 with the right picture-frame straight line (x=xR) 35. Moreover, as illustrated in FIG. 16, the vertex-points that exist outside the picture-frame out of the vertex-points (Pn) 29, i.e., the vertex-points about which xpn>xR, xpn<xL, ypn<yD, or ypn>yU holds, are excluded. Then, the remaining vertex-points are defined as effective vertex-points (P'n) 38.

Figure 17:
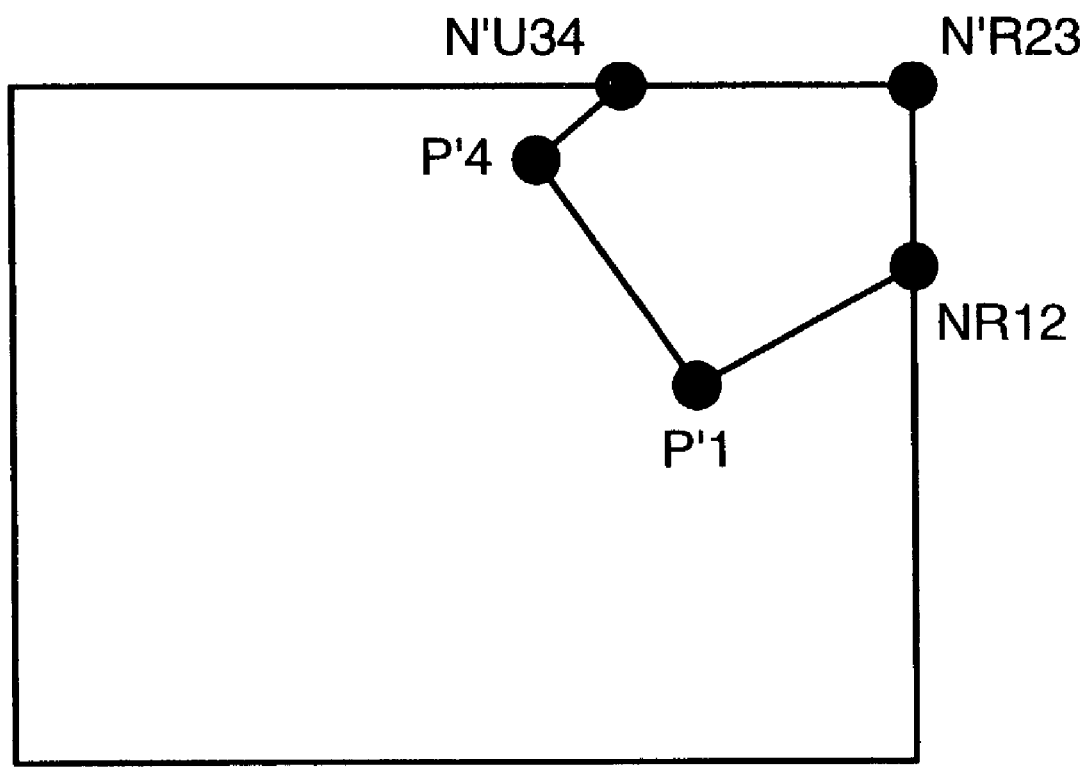
FIG. 17 is a diagram for illustrating the mask-displayed portion at the time of displaying the mask.

Next, as illustrated in FIG. 17, if the vertex-point of the picture-frame exists beyond the range to be masked, the intersection-points that exist outside the picture-frame are independently displaced to the vertex-point of the picture-frame N'R23. The operation will be explained below.

At first, attention is focused on the intersection-points NWst 33 on x=xR.

The vertex-point of the picture-frame formed by the right picture-frame (x=xR) and the down picture-frame (y=yD) exists within the range to be masked. Accordingly, if there exist odd number of intersection-points NWst 33 whose y-components yNWst satisfy yNWst<yD, an intersection-point whose yNWst is the largest of all is displaced to the vertex-point of the picture-frame formed by the right picture-frame (x=xR) and the down picture-frame (y=yD). In FIG. 16, the number of such intersection-points NWst 33 is 0 (i.e., even number). Consequently, there exists no applicable case.

Also, the vertex-point of the picture-frame formed by the right picture-frame (x=xR) and the up picture-frame (y=yU) exists within the range to be masked. Accordingly, if there exist odd number of intersection-points NWst 33 whose y-components yNWst satisfy yNWst>yU, an intersection-point whose yNWst is the smallest of all is displaced to the vertex-point of the picture-frame formed by the right picture-frame (x=xR) and the up picture-frame (y=yU). In FIG. 16, the number of such intersection-points NWst 33 is 1 (i.e., odd number), namely, the intersection-point NR23 alone. Consequently, the intersection-point NR23 whose y-component yNWst is the smallest is displaced to N'R23, i.e., the vertex-point of the picture-frame formed by the right picture-frame (x=xR) and the up picture-frame (y=yU).

Next, attention is focused on the intersection-points NWst 33 on x=xL.

The vertex-point of the picture-frame formed by the left picture-frame (x=xL) and the down picture-frame (y=yD) exists within the range to be masked. Accordingly, if there exist odd number of intersection-points NWst 33 whose y-components yNWst satisfy yNWst<yD, an intersection-point whose yNWst is the largest of all is displaced to the vertex-point of the picture-frame formed by the left picture-frame (x=xL) and the down picture-frame (y=yD). In FIG. 16, the number of such intersection-points NWst 33 is 0 (i.e., even number). Consequently, there exists no applicable case.

Also, the vertex-point of the picture-frame formed by the left picture-frame (x=xL) and the up picture-frame (y=yU) exists within the range to be masked. Accordingly, if there exist odd number of intersection-points NWst 33 whose y-components yNWst satisfy yNWst>yU, an intersection-point whose yNWst is the smallest of all is displaced to the vertex-point of the picture-frame formed by the left picture-frame (x=xL) and the up picture-frame (y=yU). In FIG. 16, the number of such intersection-points NWst 33 is 0 (i.e., even number). Consequently, there exists no applicable case.

Next, the intersection-points NWst that exist outside the picture-frame, i.e., NWst about which xNWst>xR, xNWst<xL, yNWst<yD, or yNWst>yU holds, are excluded all. Then, the remaining intersection-points NWst are defined as N'Wst 39.

Although, here, attention has been focused on the intersection-points on x=xR and those on x=xL, focusing attention on the intersection-points on y=yU and those on y=yD makes the same result available. In that case, instead of the vertex-point N'R23, the vertex-point N'U23 remains as the vertex-point of the picture-frame formed by the right picture-frame (x=xR) and the up picture-frame (y=yU).

The region surrounded by P'n 38 and N'Wst 39 determined as explained above is mask-displayed. If, however, there exists none of P'n 38 and N'Wst 39, no mask is displayed.

Figure 18:
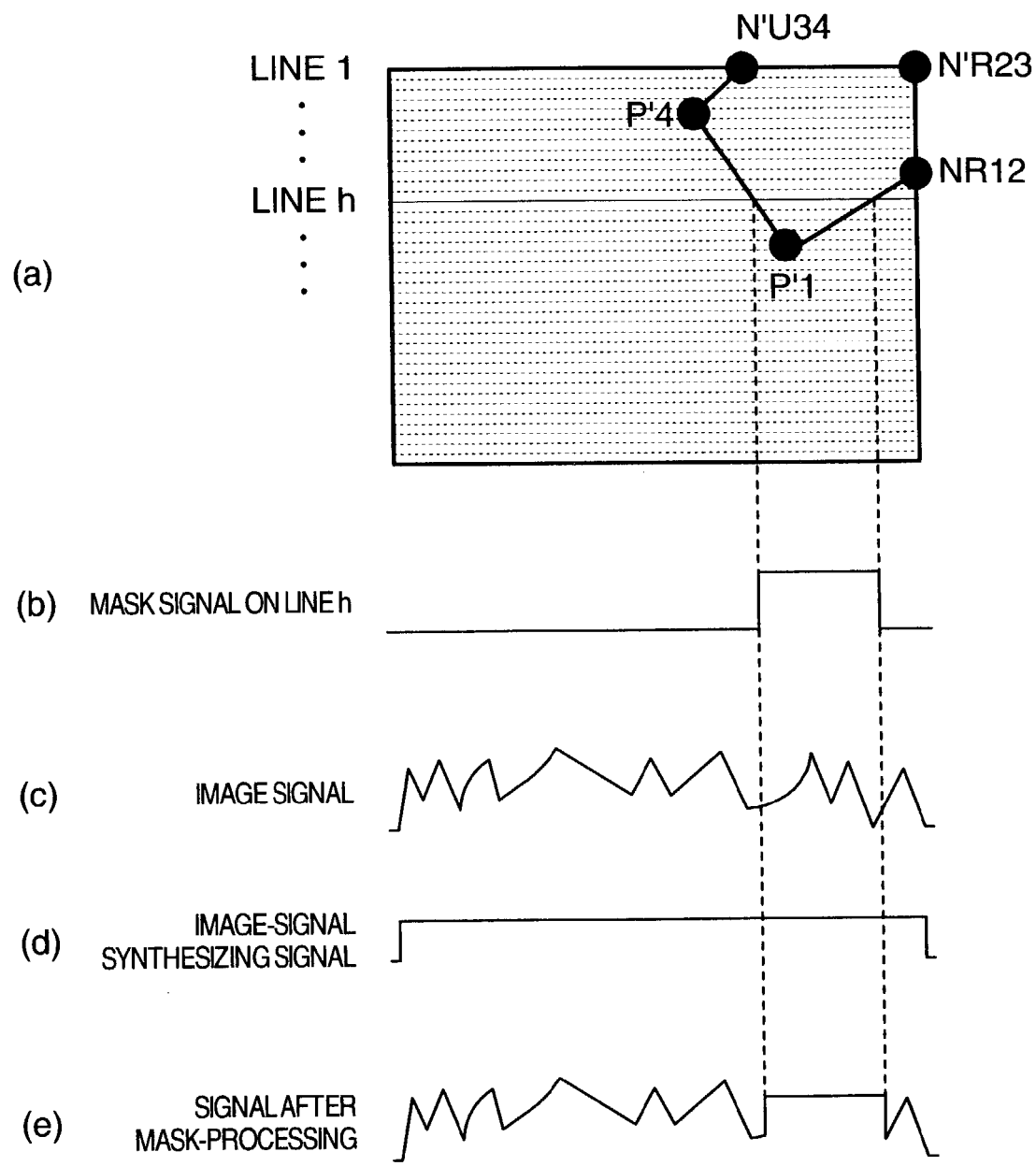
FIG. 18 is a diagram for illustrating a masking method of masking an image signal.

Referring to FIG. 18, the concrete explanation will be given below regarding the operation of the camera signal processing circuit 4 in the case where, as described above, there exists the mask area that extends off the picture-frame. FIG. 18(*a*) illustrates, on the monitor picture, the region to be masked. Here, the closed region surrounded by N'U34, N'R23, N'R12, P'1, P'4 is to be masked. FIG. 18(*b*) illustrates the mask detection signal on one horizontal-line basis. FIG. 18(*c*) illustrates an image signal of the image-sensed picture from the image-sensor 2. FIG. 18(*e*) illustrates the image signal of the masked image-sensed picture which is sent out from the image output terminal 10 after via the signal synthesizing section 4*d* of the camera signal processing circuit 4.

As illustrated in FIG. 18, the signal for indicating the vertex-points that form the region to be masked is generated as follows: At first, on each horizontal-line basis, the signal generating section 4*c* determines intersection-points of each line-segment and the region surrounded by P'n 38 and N'Wst 39, then generating the mask signal that has the following characteristic: The mask signal is at a Low level from the head of each horizontal-line to the 1st intersection-point, and is at a High level from the 1st intersection-point to the 2nd intersection-point, and is at the Low level from the 2nd intersection-point to the end of each horizontal-line. Hereinafter, the High/Low levels are toggled (i.e., alternately supplied) for each intersection-point. Next, when the mask signal is at the High level, the signal synthesizing section 4*d* synthesizes the image signal with another image-signal synthesizing signal at a 0-to-100 ratio, thereby performing the display of the mask.

Figure 19:
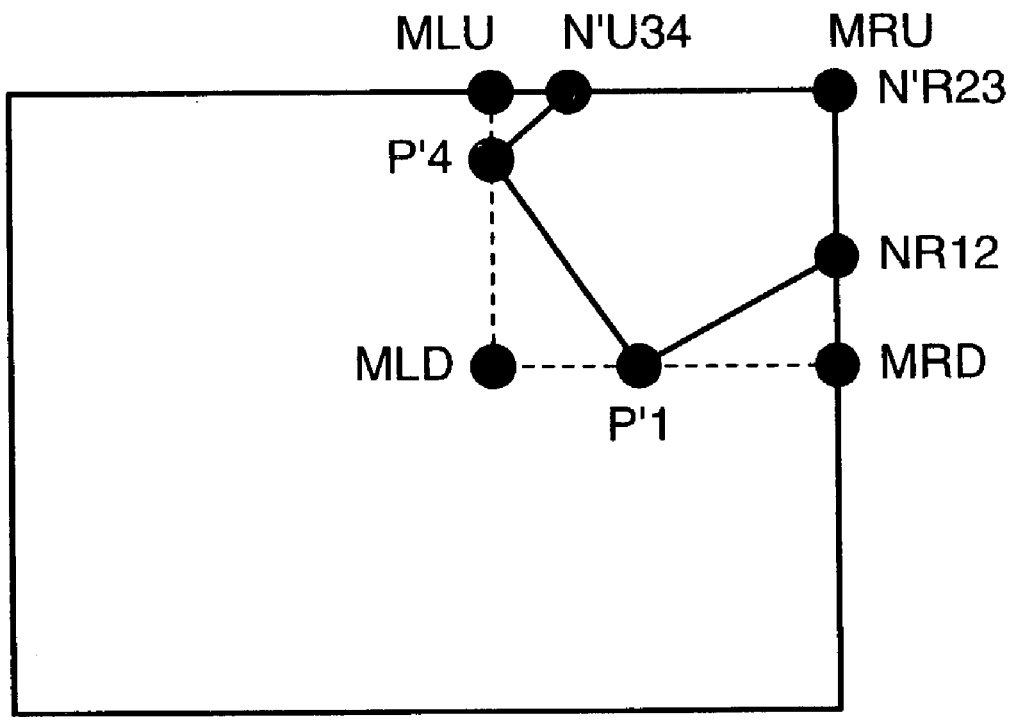
FIG. 19 is a diagram for illustrating the mask-displayed portion when the mask configuration is set up as only the horizontal× vertical rectangle.

FIG. 19 illustrates a method of further simplifying the display of the mask on the image-sensed picture.

If only a horizontal x vertical rectangle can be mask-displayed as the mask from the configuration of the signal generating section 4*c*, letting the minimum value of xp'n, xN'Wst be MIN (xp'n, xN'Wst), the maximum value of xp'n, xN'Wst be MAX (xp'n, xN'Wst), the maximum value of yp'n, yN'Wst be MAX (yp'n, yN'Wst), and the minimum value of yp'n, yN'Wst be MIN (yp'n, yN'Wst), the region surrounded by the following points is mask-displayed: The point MRU at which x=MIN (xp'n, xN'Wst), y=MAX (yp'n, yN'Wst), the point MRD at which x=MIN (xp'n, xN'Wst), y=MIN (yp'n, yN'Wst), the point MLD at which x=MAX (xp'n, xN'Wst), y=MIN (yp'n, yN'Wst), and the point MLU at which x=MAX (xp'n, xN'Wst), y=MAX (yp'n, yN'Wst).

In this way, the mask data managed using the angles of the respective vertex-points allows the positions of the respective vertex-points on the picture to be accurately determined every time the camera's direction is changed. Accordingly, it becomes possible to effectively perform the mask display toward the rotation of the privacy-protected range caused by the pan rotation near the location where the tilt angle is equal to 90° or −90°. Also, in the 3rd embodiment, the photograph-target distance (l) 25 and the distance (r) 19 from the pan/tilt rotation center (O) 15 to the center (o) 16 of the image-sensor have been used for the calculations regarding the mask setting-up and the mask display. This makes it possible to perform the mask setting-up and the mask display with almost no calculation error.

Incidentally, in the 1st to 4th embodiments, the explanation has been given assuming that the mask data calculation processing section 8b is set up in the surveillance camera 12. The mask data calculation processing section 8b, however, may also be set up in the configuration other than the surveillance camera 12, such as the rotary base 11 or the controller section 14. This is made allowable by communicating, with the communications unit such as communications cables 51a, 51b, the respective information needed for the mask data calculation processing.

Also, in the 1st to 4th embodiments, the explanation has been given assuming that the mask-displayed position calculation processing section 8c is set up in the surveillance camera 12. The mask-displayed position calculation processing section 8c, however, may also be set up in the configuration other than the surveillance camera 12, such as the rotary base 11 or the controller section 14. This is made allowable by communicating, with the communications unit such as the communications cables 51a, 51b, the respective information needed for the mask-displayed position calculation processing.

Moreover, in the 1st to 4th embodiments, the explanation has been given assuming that the signal generating section 4c for generating the mask signal is set up in the surveillance camera 12. The signal generating section 4c, however, may also be set up in the configuration other than the surveillance camera 12, such as the rotary base 11 or the controller section 14. This is made allowable by communicating, with the communications unit such as the communications cables 51a, 51b, the respective information needed for the generation of the mask signal.

Furthermore, in the 1st to 4th embodiments, the explanation has been given assuming that the signal synthesizing section 4d for synthesizing part of the image-pickup signal with the mask signal is set up in the surveillance camera 12. The signal synthesizing section 4d, however, may also be set up in the configuration other than the surveillance camera 12, such as the rotary base 11 or the controller section 14. This is made allowable by communicating, with the communications unit such as the communications cables 51a, 51b, the respective information needed for the synthesis with the mask signal.

The above-described Expressions 1 to Expressions 4 are defined as follows:

Letting $d=(r-f)/l$, [Expressions 1]

$xp=(f/xu)\cdot\sin(\theta xp-\theta xo)\cdot\cos\theta yp/\{d+\cos(\theta xp-\theta xo)\cdot\cos\theta yp\cdot\cos\theta yo+\sin\theta yp\cdot\sin\theta yo\}$, and $yp=(f/yu)\cdot\{-\cos(\theta xp-\theta xo)\cdot\cos\theta yp\cdot\sin\theta yo+\sin\theta yp\cdot\cos\theta yo\}/\{d+\cos(\theta xp-\theta xo)\cdot\cos\theta yp\cdot\cos\theta yo+\sin\theta yp\cdot\sin\theta yo\}$, where Expressions 1 hold only when $d+\cos(\theta xp-\theta xo)\cdot\cos\theta yp\cdot\cos\theta yo+\sin\theta yp\cdot\sin\theta yo>0$.

Let $xp'=xp/(f/xu)$, [Expressions 2]

$yp'=yp/(f/yu)$, $xA=d^2\cdot(yp'^2-xp'^2\cdot\sin\theta yo^2)+\{xp'^2-(\cos\theta yo-yp'\cdot\sin\theta yo)^2\}$, $xB=d^2\cdot(xp'\cdot yp'\cdot\sin\theta yo)+\{xp'\cdot(\cos\theta yo-yp'\cdot\sin\theta yo)\}$, $xC=d^2\cdot(-yp'^2-xp'^2\cdot\cos\theta yo^2)+(\cos\theta yo-yp'\cdot\sin\theta yo)^2$, $xX=xA^2+4\cdot xB^2$, $xY=2\cdot xB^2-xA\cdot xC$, and $xZ=\sqrt{\{4\cdot xB^2\cdot(xB^2-xA\cdot xC-xC^2)\}}$.

Letting $Dx1=\{1(\text{when } xp'>0), -1(\text{when } xp'<0), 0(\text{when } xp'=0)\}$, and $Dx2=\{1(\text{when } d\cdot xp'\cdot xB\cdot\cos\theta yo<0), -1(\text{when } d\cdot xp'\cdot xB\cdot\cos\theta yo\geq0)\}$, 1) when ($yp'\cdot\cos\theta yo>0$ and $-d\cdot yp'-yp'\cdot\sin\theta yo+\cos\theta yo=0$) or ($yp'\cdot\cos\theta yo\leq0$ and $d\cdot yp'-yp'\cdot\sin\theta yo+\cos\theta yo=0$), $\theta xp=Dx1\cdot(Dx1\cdot\theta xo+90)$, 2) when ($yp'\cdot\cos\theta yo>0$ and $-d\cdot yp'-yp'\cdot\sin\theta yo+\cos\theta yo>0$) or ($yp'\cdot\cos\theta yo<0$ and $d\cdot yp'-yp'\cdot\sin\theta yo+\cos\theta yo>0$), $\theta xp=\theta xo+Dx1\cdot\arccos[\sqrt{\{(xy+Dx2\cdot xZ)/xX\}}]$, and 3) when ($yp'\cdot\cos\theta yo>0$ and $-d\cdot yp'-yp'\theta\cdot\sin\theta yo+\cos\theta yo<0$) or ($yp'\cdot\cos\theta yo\leq0$ and $d\cdot yp'-yp'\cdot\sin\theta yo+\cos\theta yo<0$), $\theta xp=\theta xo-Dx1\cdot\arccos[\sqrt{\{(xY+Dx2\cdot xZ)/xX\}}]+180$.

Next, let $yA=(yp'\cdot\cos\theta yo+\sin\theta yo)\cdot\cos(\theta xp-\theta xo)$, $yB=yp'\cdot\sin\theta yo-\cos\theta yo$, $yC=d\cdot yp'$, $yX=yA^2+yB^2$, $yY=-yA\cdot yC$, $yZ=yB\cdot\sqrt{(yA^2+yB^2-yC^2)}$, $yA'=xp'\cdot\cos\theta yo\cdot\cos(\theta xp-\theta xo)-\sin(\theta xp-\theta xo)$, $yB'=xp'\cdot\sin\theta yo$, $yC'=d\cdot xp'$, $yX'=yA'^2+yB'^2$, $yY'=-yA'\cdot yC'$, and $yZ'=yB'\cdot\sqrt{(yA'^2+yB'^2-yC'^2)}$.

Letting $Dy1=\{1(\text{when } yp'\cdot\cos\theta yo+\sin\theta yo>0), -1(\text{when } yp'\cdot\cos\theta yo+\sin\theta yo\leq0)\}$, $Dy2=\{1(\text{when }\cos\theta xo\leq0), -1(\text{when }\cos\theta xo>0)\}$, and $Dy3=\{1(\text{when } yB'\geq0), -1(\text{when } yB'<0)\}$, 1) when (yp'·cos θyo>0 and –d·yp'–yp'·sin θyo+cos θyo=0) or (yp'·cos θyo≦0 and d·yp'–yp'·sin θyo+cos θyo=0),
   a) when xp'=0, $\theta yp = Dy1 \cdot \arccos\{(yY+Dy2 \cdot yZ)/yX\}$, b) when xp'≠0, $\theta yp = Dy1 \cdot \arccos\{(yY'+Dy3 \cdot yZ')/yX'\}$, 2) when (yp'·cos θyo>0 and –d·yp'–yp'·sin θyo+cos θyo>0) or (yp'·cos θyo≦0 and d·yp'–yp'·sin θyo+cos θyo>0), θyp=Dy1·arccost{yY–yZ}/yX}, and 3) when (yp'·cos θyo>0 and –d·yp'–yp'·sin θyo+cos θyo<0) or (yp'·cos θyo≦0 and d·yp'–yp'·sin θyo+cos θyo<0), θyp=Dy1·arccos{(yY+yZ)/yX}.

[Expressions 3]

intersection-points NWst (xNWst, yNWst) of line-segments PsPt and a straight line x=(xL or xR)=xW, the line-segments PsPt resulting from connecting vertex-points Ps(xps,yps) with vertex-points Pt(xpt,ypt),
1) when xps=xpt,
no intersection-point
2) when xps≠xpt, and, $\{yps \leq (ypt-yps) \cdot (xW-xps)/(xpt-xps)+xps \leq ypt$, or $ypt \leq (ypt-yps) \cdot (xW-xps)/(xpt-xps)+xps \leq yps\}$, and, $\{xps \leq xW \leq xpt$, or, $xpt \leq xW \leq xps, \}$, $NWst: xNWst=xW, yNWst=(ypt-yps) \cdot (xW-xps)/(xpt-xps)+xps$, and 3) except when 1), 2),
no intersection-point,
intersection-points NWst (xNWst, yNWst) of line-segments PsPt and a straight line y=(yD or yU)=yW, the line-segments PsPt resulting from connecting vertex-points Ps(xps,yps) with vertex-points Pt(xpt,ypt),
1) when yps=ypt,
no intersection-point
2) when yps≠ypt, and, $\{xps \leq (xpt-xps) \cdot (yW-yps)/(ypt-yps)+yps \leq xpt$, or, $xpt \leq (xpt-xps) \cdot (yW-yps)/(ypt-yps)+yps \leq xps\}$, and, $\{yps \leq yW \leq ypt$, or, $ypt \leq yW \leq yps,\}$, $NWst: xNWst=(xpt-xps) \cdot (yW-yps)/(ypt-yps)+yps, yNWst=yW$, and 3) except when 1), 2),
no intersection-point.

$xp=(f/xu) \cdot \sin(\theta xp-\theta xo) \cdot \cos \theta yp/\{\cos(\theta xp-\theta xo) \cdot \cos \theta yp \cdot \cos \theta yo + \sin \theta yp \cdot \sin \theta yo\}$, and  [Expressions 4]

$yp=(f/yu) \cdot \{-\cos(\theta xp-\theta xo) \cdot \cos \theta yp \cdot \sin \theta yo + \sin \theta yp \cdot \cos \theta yo\}/\{\cos(\theta xp-\theta xo) \cdot \cos \theta yp \cdot \cos \theta yo + \sin \theta yp \cdot \sin \theta yo\}$, where Expressions 4 hold only when cos(θxp–θxo)·cos θyp·cos θyo+sin θyp·sin θyo>0.

[Expressions 5]
1) when –yp'·sin θyo+cos θyo=0,
   a) when xp'=0,
      i) when sin θyo≧0, θxp=0, and θyp=90 ii) when sin θyo<0,

θxp=0, and

θyp=–90 b) when xp'>0,

θxp=θxo+90, and $\theta yp = \arctan[\{\sin(\theta xp-\theta xo)-\cos \theta yo \cdot \cos(\theta xp-\theta xo)\}/(xp' \cdot \sin \theta yo)]$ c) when xp'<0, θxp=θxo–90, and $\theta yp = \arctan[\{\sin(\theta xp-\theta xo)-\cos \theta yo \cdot \cos(\theta xp-\theta xo)\}/(xp' \cdot \sin \theta yo)]$ 2) when –yp'·sin θyo+cos θyo>0, $\theta xp = \theta xo + \arctan\{xp'/(\cos \theta yo - yp' \cdot \sin \theta yo)\}$, and $\theta yp = \arctan\{(yp' \cdot \cos \theta yo + \sin \theta yo) \cdot \cos(\theta xp-\theta xo)/(\cos \theta yo - yp' \cdot \sin \theta yo)\}$, and 3) when –yp'·sin θyo+cos θyo<0, $\theta xp = \theta xo + \arctan\{xp'/(\cos \theta yo - yp' \cdot \sin \theta yo)\}+180$, and $\theta yp = \arctan\{(yp' \cdot \cos \theta yo + \sin \theta yo) \cdot \cos(\theta xp-\theta xo)/(\cos \theta yo - yp' \cdot \sin \theta yo)\}$.

As is evident from the explanation given so far, in the surveillance camera apparatus for displaying, on the monitor section, the masked image-sensed picture for the privacy protection, the surveillance camera system apparatus including the rotary base thereof, and the masking method, the pixel information corresponding to a plurality of vertex-points that form a region to be masked is employed as the mask data. On account of this, the masking applied near a location directly below or above the surveillance camera, where the masking has exhibited no significant effect conventionally, exhibits a significant effect. Moreover, it becomes possible to absorb the image distortion that occurs when a photograph-target has been displaced up to a picture edge. This permits the setting-up of the mask area to be implemented at a location other than the picture center. Also, the photograph-target distance l and the distance r from the center O of the pan/tilt rotation to the center o of the image-sensor have been used for the calculations on the mask setting-up and the mask display. This results in none of the calculation error caused by the camera-mounted position onto a dome, thereby allowing the accurate mask setting-up and display to be implemented.

Furthermore, it becomes possible to absorb the mask rotation due to the tilt angle, the image distortion that occurs when the photograph-target has been displaced up to the picture edge, and the calculation error caused by the camera-mounted position onto the dome. This permits the privacy protection to be implemented without lowering the surveillance function.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A surveillance camera apparatus having an image-pickup unit and a signal processing unit for processing an image-pickup signal, and sending out an image-sensed picture, and being mountable onto a rotary base, said image-pickup unit locating therein an image-sensor and an optical lens, said surveillance camera apparatus, comprising:
a first storage unit for storing a size of pixels configuring said image-sensor,
computation means for performing a computation using first information, second information, third information, and fourth information so as to calculate angle information on a plurality of vertex-points that form a region to be masked, said information stored in said first storage unit being defined as said first information, a focal length of said optical lens being defined as said second information, angle information on an optical axis that passes through a rotation center of said surveillance camera apparatus after being mounted onto said rotary base and that becomes a normal to a plane formed by said image-sensor being defined as said third information, and pixel information corresponding to said plurality of vertex-points that form said region to be masked whose image has been picked up by said image-sensor being defined as said fourth information, and
a second storage unit for storing said computation result by said computation means.

2. The surveillance camera apparatus as claimed in claim 1, comprising:
an optical system including said image-sensor and a relatively-displaceable zoom-lens,
calculation means for calculating said focal length from a position of said zoom-lens, said computation means performing said computation including said information calculated by said calculation means, and
said second storage unit for storing said computation result by said computation means.

3. The surveillance camera apparatus as claimed in claim 1, further comprising:
computation means for performing a computation using said information read out from said second storage unit, said first information, said second information, and said third information so as to obtain said pixel information corresponding to said plurality of vertex-points that form said region to be masked on said image-sensor, and
a controller unit for controlling said surveillance camera apparatus, wherein said region of said image-pickup signal is masked and sent out, as said image-sensed picture, to a monitor unit for displaying said image-pickup signal as said image-sensed picture, said region resulting from connecting said pixels corresponding to said plurality of vertex-points.

4. A surveillance camera system apparatus including a surveillance camera and a rotary base for rotatably supporting said surveillance camera, said surveillance camera having an image-pickup unit and a signal processing unit for processing an image-pickup signal, and sending out an image-sensed picture, said image-pickup unit locating therein an image-sensor and an optical lens,
said surveillance camera system apparatus comprising said surveillance camera and said rotary base,
said surveillance camera, comprising:
a first storage unit for storing a size of pixels configuring said image-sensor,
computation means for performing a computation using first information, second information, third information, and fourth information so as to obtain angle information on a plurality of vertex-points that form a region to be masked, said information stored in said first storage unit being defined as said first information, a focal length of said optical lens being defined as said second information, angle information on an optical axis that passes through a rotation center of said rotatably-supported surveillance camera and that becomes a normal to a plane formed by said image-sensor being defined as said third information, and pixel information corresponding to said plurality of vertex-points that form said region to be masked whose image has been picked up by said image-sensor being defined as said fourth information, and
a second storage unit for storing said computation result by said computation means.

5. The surveillance camera system apparatus as claimed in claim 4, comprising said surveillance camera and said rotary base,
said surveillance camera, comprising:
an optical system including said image-sensor and a relatively-displaceable zoom-lens,
calculation means for calculating said focal length from a position of said zoom-lens, said computation means performing said computation including said information calculated by said calculation means, and
said second storage unit for storing said computation result by said computation means.

6. The surveillance camera system apparatus as claimed in claim 4, wherein said surveillance camera further comprises:
computation means for performing a computation using said information read out from said second storage unit, said first information, said second information, and said third information so as to obtain said pixel information corresponding to said plurality of vertex-points that form said region to be masked on said image-sensor, and
a controller unit for controlling said surveillance camera system apparatus, said region of said image-pickup signal being masked and sent out, as said image-sensed picture, to a monitor unit for displaying said image-pickup signal as said image-sensed picture, said region resulting from connecting said pixels corresponding to said plurality of vertex-points.

7. A surveillance camera apparatus having an image-pickup unit, distance-measuring means for measuring a distance up to a photograph-target, and a signal processing unit for processing an image-pickup signal, and sending out an image-sensed picture, and being mountable onto a rotary base, said image-pickup unit including an image-sensor and optical lenses including a relatively-displaceable zoom-lens, said surveillance camera apparatus, comprising:
a first storage unit for storing a size of pixels configuring said image-sensor,
a third storage unit for storing a distance up to said image-sensor from a rotation center of said surveillance camera apparatus after being mounted onto said rotary base,
calculation means for calculating a focal length from a position of said zoom-lens,
computation means for performing a computation using first information through sixth information so as to calculate angle information on a plurality of vertex-points that form a region to be masked, said information stored in said first storage unit being defined as said first information, said information by said calculation means being defined as said second information, angle information on an optical axis that passes through said rotation center of said surveillance camera apparatus after being mounted onto said rotary base and that becomes a normal to a plane formed by said image-sensor being defined as said third information, pixel information corresponding to said plurality of vertex-points that form said region to be masked whose image has been picked up by said image-sensor being defined as said fourth information, said information stored in said third storage unit being defined as said fifth information, and said distance up to said photograph-target that exists in said region to be masked whose image has been picked up by said image-sensor being defined as said sixth information, said distance being measured by said distance-measunng means, and a second storage unit for storing said computation result by said computation means and said sixth information.

8. The surveillance camera apparatus as claimed in claim 7, wherein said optical lenses further include a relatively-displaceable focus-lens, and calculation means is employed as said distance-measuring means, said calculation means calculating said distance up to said photograph-target by using image-pickup signal luminance edge-component information obtained by said signal processing unit, said position of said zoom-lens, and a position of said focus-lens, said photograph-target existing in said region to be masked whose image has been picked up by said image-sensor.

9. A surveillance camera system apparatus including a surveillance camera and a rotary base for rotatably supporting said surveillance camera, said surveillance camera having an image-pickup unit, distance-measuring means for measuring a distance up to a photograph-target, and a signal processing unit for processing an image-pickup signal, and sending out an image-sensed picture, said image-pickup unit including an image- sensor and optical lenses including a relatively-displaceable zoom-lens, said surveillance camera system apparatus comprising said surveillance camera and said rotary base, said surveillance camera, comprising:

a first storage unit for storing a size of pixels configuring said image-sensor, a third storage unit for storing a distance up to said image-sensor from a rotation center of said rotatably-supported surveillance camera, calculation means for calculating a focal length from a position of said zoom-lens, computation means for performing a computation using first information through sixth information so as to calculate angle information on a plurality of vertex-points that form a region to be masked, said information stored in said first storage unit being defined as said first information, said information by said calculation means being defined as said second information, angle information on an optical axis that passes through said rotation center of said rotatably-supported surveillance camera and that becomes a normal to a plane formed by said image-sensor being defined as said third information, pixel information corresponding to said plurality of vertex-points that form said region to be masked whose image has been picked up by said image-sensor being defined as said fourth information, said information stored in said third storage unit being defined as said fifth information, and said distance up to said photograph-target that exists in said region to be masked whose image has been picked up by said image-sensor being defined as said sixth information, said distance being measured by said distance-measuring means, and a second storage unit for storing said computation result by said computation means and said sixth information.

10. The surveillance camera system apparatus as claimed in claim 9, wherein said optical lenses further include a relatively-displaceable focus-lens, and calculation means is employed as said distance-measuring means, said calculation means calculating said distance up to said photograph-target by using image-pickup signal luminance edge-component information obtained by said signal processing unit, said position of said zoom-lens, and a position of said focus-lens, said photograph-target existing in said region to be masked whose image has been picked up by said image-sensor.

11. An image-sensed picture masking method in a system comprising:

a surveillance camera having an image-pickup unit and a signal processing unit for processing an image-pickup signal, and sending out an image-sensed picture, said image-pickup unit locating therein an image-sensor and an optical lens, a rotary base for rotatably supporting said surveillance camera, a controller unit for controlling said surveillance camera, and a monitor unit for displaying said image-pickup signal as said image-sensed picture, said surveillance camera, comprising:

a first storage unit for storing a size of pixels configuring said image-sensor, computation means for performing a computation using first information, second information, third information, and fourth information so as to obtain angle information on a plurality of vertex-points that form a region to be masked, said information stored in said first storage unit being defined as said first information, a focal length of said optical lens being defined as said second information, angle information on an optical axis that passes through a rotation center of said rotatably-supported surveillance camera and that becomes a normal to a plane formed by said image-sensor being defined as said third information, and pixel information corresponding to said plurality of vertex-points that form said region to be masked whose image has been picked up by said image-sensor being defined as said fourth information, and a second storage unit for storing said computation result by said computation means, said image-sensed picture masking method, comprising the steps of:

specifying said region to be masked at said controller unit on a basis of said image-sensed picture displayed on said monitor unit, defining, as said fourth information, said pixel information on said plurality of vertex-points that form said region to be masked, computing, by said computation means, said angle information on said plurality of vertex-points that form said region to be masked, and storing said angle information into said second storage unit.

12. The image-sensed picture masking method as claimed in claim 11, wherein said system comprises an optical system including said image-sensor and a relatively-displaceable zoom-lens, and calculation means for calculating said focal length from a position of said zoom-lens, said image-sensed picture masking method, comprising the steps of:

performing, by said computation means, said computation including said information calculated by said calculation means, and storing said computation result by said computation means into said second storage unit.

13. The image-sensed picture masking method as claimed in claim 11, further comprising the steps of:

performing a computation using said information read out from said second storage unit, said first information, said second information, and said third information, determining, based on said computation result, said pixel information corresponding to said plurality of vertex-points that form said region to be masked on said image-sensor, and masking and sending out, as said image-sensed picture, said region resulting from connecting said plurality of vertex-points.

14. The image-sensed picture masking method as claimed in claim 13, further comprising the steps of:

letting a transverse direction of said image-sensor screen be an x-axis and a longitudinal direction perpendicular to said x-axis be a y-axis, and masking and sending out, as said image-sensed picture, a rectangular closed region formed by straight lines parallel to said x-axis and straight lines parallel to said y-axis, said straight lines also circumscribing said plurality of vertex-points that form said region to be masked, said plurality of vertex-points being stored in said second storage unit.

15. The image-sensed picture masking method as claimed in claim 13, further comprising the steps of:

determining intersection-points at which straight lines intersect with line-segments, said straight lines forming a picture-frame of said image-sensor, said line-segments being formed by said plurality of vertex-points that form said region to be masked, said plurality of vertex-points being stored in said second storage unit, and masking and sending out, as said image-sensed picture, a closed region resulting from connecting said intersection-points with said vertex-points that are positioned inside said picture-frame of said image-sensor.

16. The image-sensed picture masking method as claimed in claim 13, further comprising the steps of:

letting a transverse direction of said image-sensor screen be an x-axis and a longitudinal direction perpendicular to said x-axis be a y-axis, said image-sensor being of a rectangle formed by straight lines parallel to said x-axis and straight lines parallel to said y-axis, and setting up, as P'n, where n is an, arbitrary natural number, said plurality of vertex-points that form said region to be masked and that are positioned inside a picture-frame of said image-sensor, said plurality of vertex-points being stored in said second storage unit, and setting up, as Nn, where n is an, arbitrary natural number, intersection-points at which line-segments formed by said plurality of vertex-points P'n intersect with said straight lines parallel to said x-axis and said straight lines parallel to said y-axis, said straight lines forming said picture-frame of said image-sensor, and, if a vertex-point of said picture-frame of said image-sensor, at which said straight line parallel to said x-axis and said straight line parallel to said y-axis intersect with each other, exists inside said closed region formed by said plurality of vertex-points P'n that form said region to be masked, setting up, as N'n (n: arbitrary natural number), said vertex-point of said picture-frame of said image-sensor, and masking and sending out, as said image-sensed picture, a closed region resulting from connecting said vertex-points P'n, said intersection-points Nn, and said vertex-point N'n of said picture-frame.

17. The image-sensed picture masking method as claimed in claim 11, further comprising the steps of:

letting said first information be xu, yu, said second information be f, said third information be θxo, θyo, and said fourth information be xp, yp, and when letting said angle information stored in said second storage unit be θxp, θyp, computing said xp, yp, which become said plurality of vertex-points that form said region to be masked, using $$xp=(f/xu)\cdot\sin(\theta xp-\theta xo)\cdot\cos\theta yp/\{\cos(\theta xp-\theta xo)\cdot\cos\theta yp\cdot\cos\theta yo+\sin\theta yp\cdot\sin\theta yo\},$$

and $$yp=(f/yu)\cdot\{-\cos(\theta xp-\theta xo)\cdot\cos\theta yp\cdot\sin\theta yo+\sin\theta yp\cdot\cos\theta yo\}/\{\cos(\theta xp-\theta xo)\cdot\cos\theta yp\cdot\cos\theta yo+\sin\theta yp\cdot\sin\theta yo\},$$

where these expressions hold only when $\cos(\theta xp-\theta xo)\cdot\cos\theta yp\cdot\cos\theta yo+\sin\theta yp\cdot\sin\theta yo>0$, and also sin indicates sine and cos indicates cosine.

18. An image-sensed picture masking method in a system comprising:

a surveillance camera having an image-pickup unit, distance-measuring means for measuring a distance up to a photograph-target, and a signal processing unit for processing an image-pickup signal, and sending out an image-sensed picture, said image-pickup unit including an image-sensor and optical lenses including a relatively-displaceable zoom-lens, a rotary base for rotatably supporting said surveillance camera, a controller unit for controlling said surveillance camera, and a monitor unit for displaying said image-pickup signal as said image-sensed picture, said surveillance camera, comprising:

a first storage unit for storing a size of pixels configuring said image-sensor, a third storage unit for storing a distance up to said image-sensor from a rotation center of said rotatably-supported surveillance camera, calculation means for calculating a focal length from a position of said zoom-lens, computation means for performing a computation using first information through sixth information so as to obtain angle information on a plurality of vertex-points that form a region to be masked, said information stored in said first storage unit being defined as said first information, said information by said calculation means being defined as said second information, angle information on an optical axis that passes through said rotation center of said rotatably-supported surveillance camera and that becomes a normal to a plane formed by said image-sensor being defined as said third information, pixel information corresponding to said plurality of vertex-points that form said region to be masked whose image has been picked up by said image-sensor being defined as said fourth information, said information stored in said third storage unit being defined as said fifth information, and said distance up to said photograph-target that exists in said region to be masked whose image has been picked up by said image-sensor being defined as said sixth information, said distance being measured by said distance-measuring means, and a second storage unit for storing said computation result by said computation means and said sixth information, said image-sensed picture masking method, comprising the steps of:

specifying said region to be masked at said controller unit on a basis of said image-sensed picture displayed on said monitor unit, defining, as said fourth information, said pixel information on said plurality of vertex-points that form said region to be masked, computing, by said computation means, said angle information on said plurality of vertex-points that form said region to be masked, and storing said angle information into said second storage unit.

19. The image-sensed picture masking method as claimed in claim 18, wherein said optical lenses further include a focus-lens, and calculation means is employed as said distance-measuring means, said calculation means calculating said distance up to said photograph-target by using image-pickup signal luminance edge-component information obtained by said signal processing unit for processing said image-pickup signal, said position of said zoom-lens, and a position of said focus-lens, said photograph-target existing in said region to be masked whose image has been picked up by said image-sensor.

20. The image-sensed picture masking method as claimed in claim 18, further comprising the steps of:

letting said first information be xu, yu, said second information be f, said third information be θxo, θyo, said fourth information be xp, yp, said fifth information be r, and said sixth information be 1, and when letting said angle information stored in said second storage unit be θxp, θyp, computing said xp, yp, which become said plurality of vertex-points that form said region to be masked, using $$xp=(f/xu)\cdot\sin(\theta xp-\theta xo)\cdot\cos\theta yp/\{d+\cos(\theta xp-\theta xo)\cdot\cos\theta yp\cdot\cos\theta yo+\sin\theta yp\cdot\sin\theta yo\},$$

and $$yp=(f/yu)\cdot\{-\cos(\theta xp-\theta xo)\cdot\cos\theta yp\cdot\sin\theta yo+\sin\theta yp\cdot\cos\theta yo\}/\{d+\cos(\theta xp-\theta xo)\cdot\cos\theta yp\cdot\cos\theta yo+\sin\theta yp\cdot\sin\theta yo\},$$

where, let d=(r−f)/l, and these expressions hold only when d+cos(θxp−θxo)·cos θyp·cos θyo+sin θyp·sin θyo>0, and also sin indicates sine and cos indicates cosine, and thereby determining said plurality of vertex-points.

* * * * *